US010748301B2

(12) United States Patent
Hakoshima

(10) Patent No.: US 10,748,301 B2
(45) Date of Patent: Aug. 18, 2020

(54) CORNEAL REFLEX POSITION DETECTION DEVICE, EYE-GAZE TRACKING DEVICE, AND CORNEAL REFLEX POSITION DETECTION METHOD

(71) Applicant: JVC KENWOOD Corporation, Yokohama-shi, Kanagawa (JP)

(72) Inventor: Shuji Hakoshima, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 113 days.

(21) Appl. No.: 16/181,393

(22) Filed: Nov. 6, 2018

(65) Prior Publication Data
US 2019/0206082 A1    Jul. 4, 2019

(30) Foreign Application Priority Data

Dec. 28, 2017    (JP) .................. 2017-254816

(51) Int. Cl.
| | |
|---|---|
| *G06T 7/00* | (2017.01) |
| *G06K 9/00* | (2006.01) |
| *G06T 7/73* | (2017.01) |
| *G06T 7/90* | (2017.01) |

(52) U.S. Cl.
CPC .............. *G06T 7/74* (2017.01); *G06K 9/0061* (2013.01); *G06K 9/00604* (2013.01); *G06T 7/90* (2017.01); *G06T 2207/10024* (2013.01); *G06T 2207/30201* (2013.01)

(58) Field of Classification Search
CPC ... G06T 7/74; G06T 7/90; G06T 2207/10024; G06T 2207/30201; G06K 9/00604; G06K 9/0061
See application file for complete search history.

(56) References Cited

U.S. PATENT DOCUMENTS

| | | | | |
|---|---|---|---|---|
| 5,983,030 | A * | 11/1999 | Nagano .................. | G02B 7/287 396/51 |
| 2013/0243251 | A1* | 9/2013 | Nakashima .......... | G06K 9/0061 382/103 |

(Continued)

FOREIGN PATENT DOCUMENTS

JP    2017-079883    5/2017

OTHER PUBLICATIONS

Tsai, Roger Y, A Versatile Camera Calibration Technique for High-Accuracy 3D Machine Vision Metrology Using Off-the-Shelf TV Cameras and Lenses, IEEE Journal of Robotics and Automation, pp. 323-344, vol. RA-3, No. 4, 1987.

*Primary Examiner* — Ping Y Hsieh
(74) *Attorney, Agent, or Firm* — Amin, Turocy & Watson, LLP

(57) ABSTRACT

A corneal reflex position detection device includes a pupil detecting unit that detects the center position of the pupil from an image of an eye of a test subject; and a corneal reflex detecting unit that detects the corneal reflex area from the image. The corneal reflex detecting unit enlarges, in a stepwise manner, a detection target area with reference to the center position of the pupil, to detect whether or not a high-luminance area having the luminance to be equal to or greater than a luminance threshold value is present in the image; and, if the high-luminance area is detected, determines that the high-luminance area represents the corneal reflex area.

5 Claims, 16 Drawing Sheets

(56) References Cited

U.S. PATENT DOCUMENTS

| | | | | |
|---|---|---|---|---|
| 2014/0085451 A1* | 3/2014 | Kamimura | ......... | H04N 5/23219 |
| | | | | 348/78 |
| 2016/0081547 A1* | 3/2016 | Gramatikov | ......... | A61B 3/0025 |
| | | | | 351/210 |
| 2016/0262614 A1* | 9/2016 | Ninomiya | ............ | A61B 3/0008 |
| 2017/0116736 A1* | 4/2017 | Yoshioka | ............... | A61B 5/163 |
| 2017/0286771 A1* | 10/2017 | Ishii | ..................... | A61B 3/0025 |
| 2017/0351929 A1* | 12/2017 | Kim | ................... | G06K 9/00919 |

* cited by examiner

CORNEAL REFLEX POSITION DETECTION DEVICE, EYE-GAZE TRACKING DEVICE, AND CORNEAL REFLEX POSITION DETECTION METHOD

CROSS-REFERENCE TO RELATED APPLICATION

This application claims priority from Japanese Application No. 2017-254816, filed on Dec. 28, 2017, the content of which is incorporated by reference herein in its entirety.

BACKGROUND

1. Technical Field

The present disclosure relates to a corneal reflex position detection device, an eye-gaze tracking device, and a corneal reflex position detection method.

2. Description of the Related Art

As one of the eye-gaze tracking technologies, the corneal reflex technology is known in which infrared light is emitted from a light source toward a test subject; each eye of the test subject, who is illuminated by infrared light, is captured using a camera; the position of each pupil with respect to the corneal reflex, which represents the reflection image of the light source on the corneal surface, is detected; and accordingly the eye gaze of the test subject is tracked. In the case of tracking the eye gaze according to such a detection method, the position of the corneal reflex needs to be detected with accuracy.

Meanwhile, if the test subject is wearing a pair of eyeglasses, it is difficult to distinguish between the image of the corneal reflex and the reflection image formed due to the pair of eyeglasses. In that regard, for example, in the method disclosed in Japanese Laid-open Patent Publication No. 2017-79883 A, the areas of illumination by the light sources are varied so as to distinguish between the corneal reflex and the reflection image formed due to the pair of eyeglasses.

However, regarding the method disclosed in Japanese Laid-open Patent Publication No. 2017-79883 A, the implementation is difficult in an environment in which the area of illumination by the light sources cannot be varied.

SUMMARY

It is an object of the present disclosure to at least partially solve the problems in the conventional technology.

A corneal reflex position detection device according to one embodiment includes a pupil detecting unit that detects center position of pupil from an image of an eye of a test subject, and a corneal reflex detecting unit that detects a corneal reflex area from the image. The corneal reflex detecting unit enlarges, in a stepwise manner, a detection target area with reference to the center position of the pupil, to detect whether or not a high-luminance area having luminance to be equal to or greater than a luminance threshold value is present in the image, if the high-luminance area is detected, determines that the high-luminance area represents the corneal reflex area, further calculates dimensions of the high-luminance area upon detection thereof, and if calculated dimensions of the high-luminance area are equal to or smaller than a dimensions threshold value, determines that the high-luminance area represents the corneal reflex area.

An eye-gaze tracking device according to one embodiment includes the corneal reflex position detection device described above.

A corneal reflex point detection method according to one embodiment includes detecting center position of pupil from an image of an eye of a test subject, and detecting a corneal reflex area from the image. The detecting of the corneal reflex area includes enlarging, in a stepwise manner, a detection target area with reference to the center position of the pupil, to detect whether or not a high-luminance area having luminance to be equal to or greater than a luminance threshold value is present in the image, if the high-luminance area is detected, determining that the high-luminance area represents the corneal reflex area, further calculates dimensions of the high-luminance area upon detection thereof, and if calculated dimensions of the high-luminance area are equal to or smaller than a dimensions threshold value, determines that the high-luminance area represents the corneal reflex area.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Figure 1:
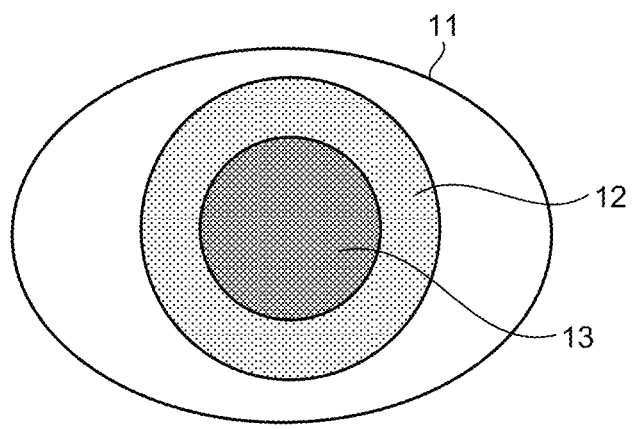
FIG. 1 is a diagram illustrating the condition of an eye of a test subject when a single light source is used.

An exemplary embodiment of a corneal reflex position detection device, an eye-gaze tracking device, and a corneal reflex position detection method according to the present disclosure is described below in detail with reference to the accompanying drawings. However, the present disclosure is not limited by the present embodiment described below. Moreover, the following explanation is given for an example in which an eye-gaze tracking device is used in an evaluation device that performs evaluation about developmental disorders using the eye-gaze tracking result. However, the device in which the eye-gaze tracking device can be used is not limited to an evaluation device.

As described above, in the commonplace point-of-regard detection, the point of regard is not necessarily always obtainable due to individual differences and the effect of the environment. The evaluation device according to the present embodiment represents a device for detecting the point of regard of the test subject with respect to a monitor screen, and displays information indicating the detection status of the point of regard (status information) in an imperceptible manner to the test subject in some portion of the monitor screen shown to the test subject. As a result, it becomes possible for a third person to understand, in real time, the detection status of the point of regard of the test subject, thereby enabling achieving enhancement in the efficiency of the overall point-of-regard measurement.

Meanwhile, the eye-gaze tracking device (evaluation device) according to the present embodiment detects the eye gaze using illumination units installed at two positions. Moreover, the eye-gaze tracking device (evaluation device) according to the present embodiment calculates, with a high degree of accuracy, the center positions of the corneal curvatures using the result obtained when measurement is performed by making the test subject gaze at one point before the eye-gaze tracking is performed.

An illumination unit is a component that includes a light source and that is capable of emitting light into the eyes of the test subject. A light source represents an element for generating light, such as a light emitting diode (LED). The light source can be configured using a single LED or can be configured by arranging a combination of a plurality of LEDs at one position. In the following explanation, the term "light source" is sometimes used as the term representing the illumination unit.

In order to perform visual point detection with accuracy, it is important to be able to correctly detect the positions of the pupils. In a case where a near-infrared light source is turned on and a camera is used to capture images, when the distance between the camera and the light source becomes equal to or greater than a certain distance, it is known that the pupils become darker than the other portion. Using this characteristic, the positions of the pupils are detected.

In the present embodiment, two light sources are disposed at positions on the outside of two cameras. The two light sources are turned on at mutually different timings, and the capturing is performed using the camera that has the greater distance (that is farther) from the light source being turned on. As a result, the pupils can be captured to be darker, and can be distinguished from the other portion with a higher degree of accuracy.

In this case, since there are different light sources that need to be turned on, the usual three-dimensional measurement based on the stereo system cannot be implemented in a simplistic form. That is, the straight line joining a light source and the corneal reflex at the time of obtaining the visual point cannot be calculated in the global coordinates. In that regard, in the present embodiment, at the two timings, the positional relationship between the cameras used in capturing as well as the positional relationship of the light sources that are turned on is set to be symmetrical with respect to the position of a virtual light source (a virtual light source position). Then, the two coordinate values obtained at the timings of turning on the two light sources are converted into global coordinates as the coordinate value for the left-side camera and the coordinate value for the right-side camera. As a result, using the corneal reflex position obtained at the timing of turning on each of the two light sources, the straight line joining the virtual light source and the corneal reflex can be calculated in the global coordinates, and the visual point can be calculated based on the straight line.

Figure 2:
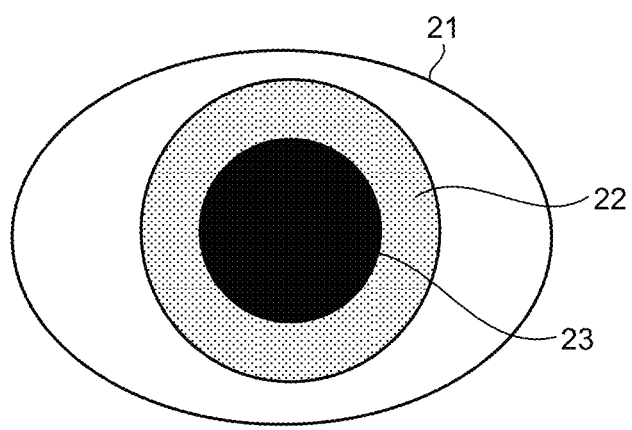
FIG. 2 is a diagram illustrating the condition of an eye of a test subject when two light sources are used.

FIG. 1 is a diagram illustrating the condition of an eye 11 of the test subject when a single light source is used. As illustrated in FIG. 1, an iris 12 and a pupil 13 do not sufficiently differ in darkness, thereby making it difficult to distinguish them from each other. FIG. 2 is a diagram illustrating the condition of an eye 21 of the test subject when two light sources are used. As illustrated in FIG. 2, an iris 22 and a pupil 23 have a greater difference in darkness as compared with FIG. 1.

Figure 3:
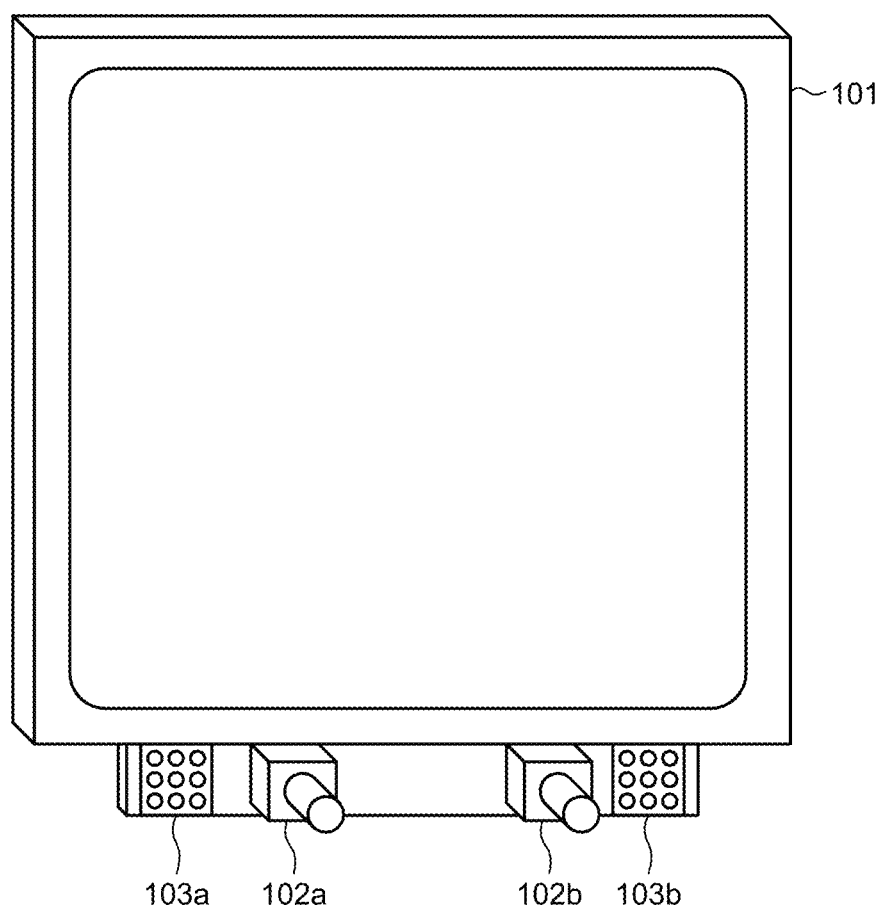
FIGS. 3 and 4 are diagrams illustrating an exemplary positioning of a display unit, a stereo camera, infrared light sources, and the test subject according to an embodiment.
Figure 4:
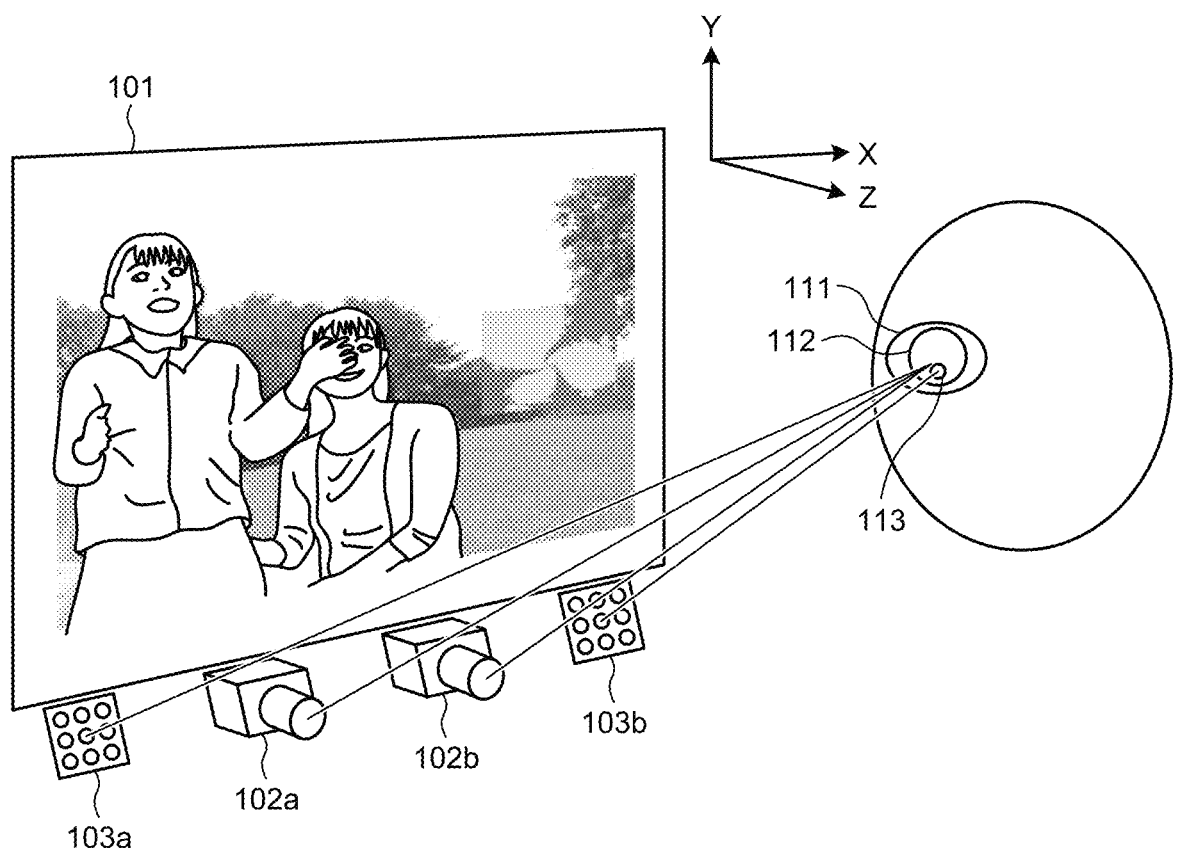

FIGS. 3 and 4 are diagrams illustrating an exemplary positioning of a display unit, a stereo camera, infrared light sources, and the test subject according to an embodiment.

As illustrated in FIG. 3, the evaluation device according to the present embodiment includes a display unit 101, a right-side camera 102a and a left-side camera 102b constituting a stereo camera, and LED light sources 103a and 103b. The right-side camera 102a and the left-side camera 102b are disposed below the display unit 101. The LED light sources 103a and 103b are disposed at positions on the outside of the right-side camera 102a and the left-side camera 102b, respectively. The LED light sources 103a and 103b are light sources for emitting near-infrared rays having the wavelength of, for example, 850 nm. In FIG. 3 is illustrated an example in which each of the LED light sources 103a and 103b (illumination units) is made of nine LEDs. In the right-side camera 102a as well as the left-side camera 102b, a lens is used that is capable of transmitting near-infrared rays having the wavelength of 850 nm. Meanwhile, the positions of the LED light sources 103a and 103b and the positions of the right-side camera 102a and the left-side camera 102b can be reversed. That is, the LED light sources 103a and 103b can be disposed at positions on the inside of the right-side camera 102a and the left-side camera 102b, respectively.

As illustrated in FIG. 4, the LED light sources 103a and 103b emit near-infrared light toward an eye 111 of the test subject. When the LED light source 103a emits light, the capturing is performed using the left-side camera 102b. When the LED light source 103b emits light, the capturing is performed using the right-side camera 102a. If the right-side camera 102a and the left-side camera 102b are set to have a proper positional relationship with the LED light sources 103a and 103b; then, in the captured images, a pupil 112 becomes darker due to reflection at low brightness and a corneal reflex 113 that is generated as a virtual image inside the eye 111 becomes brighter due to reflection at high brightness. Hence, the in-image positions of the pupil 112 and the corneal reflex 113 can be obtained by each of the two cameras (i.e., the right-side camera 102a and the left-side camera 102b).

Moreover, from the positions of the pupil 112 and the corneal reflex 113 as obtained using the two cameras, three-dimensional global coordinate values of the positions of the pupil 112 and the corneal reflex 113 are calculated. In the present embodiment, as the three-dimensional global coordinates, the center position of the screen of the display unit 101 represents the origin; the vertical direction represents Y coordinates (positive coordinates upward); the horizontal direction represents X coordinates (positive coordinates on the right-hand side); and the depth direction represents Z coordinates (positive coordinates on the near side).

Figure 5:
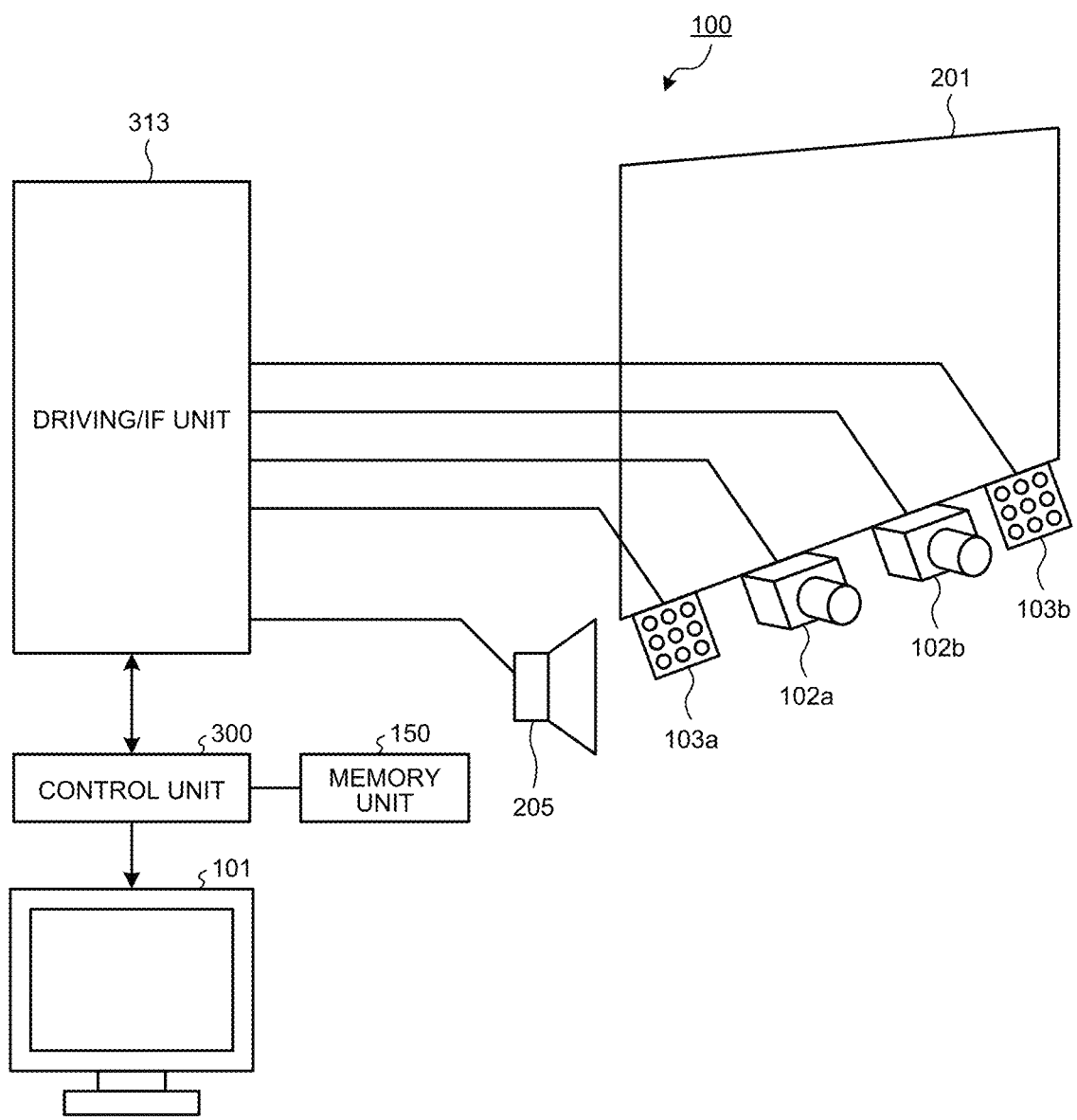
FIG. 5 is a diagram illustrating the outline of the functions of an evaluation device.

FIG. 5 is a diagram illustrating the outline of the functions of an evaluation device 100. In the present embodiment, the evaluation device 100 is used, for example, as a corneal reflex position detection device that detects the position of the corneal reflex points of the eyes of the test subject, or as an eye-gaze tracking device that detects the eye gaze of the test subject. In the following explanation, the evaluation device 100 is sometimes referred to as the corneal reflex position detection device 100 or the eye-gaze tracking device 100 as may be appropriate. In FIG. 5 is illustrated some part of the configuration illustrated in FIGS. 3 and 4 and a configuration used for driving that part. As illustrated in FIG. 5, the evaluation device 100 includes the right-side camera 102a, the left-side camera 102b, the LED light source 103a meant for the left-side camera 102b, the LED light source 103b meant for the right-side camera 102a, a speaker 205, a driving/interface (IF) unit 313, a control unit 300, a memory unit 150, and the display unit 101. In FIG. 5, although a display screen 201 is used to illustrate the positional relationship between the right-side camera 102a and the left-side camera 102b in an easy-to-understand manner, the display screen 201 is a screen displayed in the display unit 101. Meanwhile, the driving unit and the IF unit can be configured in an integrated manner or can be configured as separate units.

The speaker 205 functions as a sound output unit that, at the time of calibration, outputs a sound for calling attention of the test subject.

The driving/IF unit 313 drives the components of the stereo camera. Moreover, the driving/IF unit 313 represents the interface between the components of the stereo camera and the control unit 300.

The control unit 300 can be implemented using, for example, a computer that includes a control device such as a central processing unit (CPU); memory devices such as a read only memory (ROM) and a random access memory (RAM); a communication I/F that establishes connection with a network and performs communication; and a bus that connects the constituent elements to each other.

The memory unit 150 is used to store a variety of information such as a control program, the measurement result, and the evaluation result. For example, the memory unit 150 is used to store images to be displayed in the display unit 101. The display unit 101 displays a variety of information such as target images for evaluation.

Figure 6:
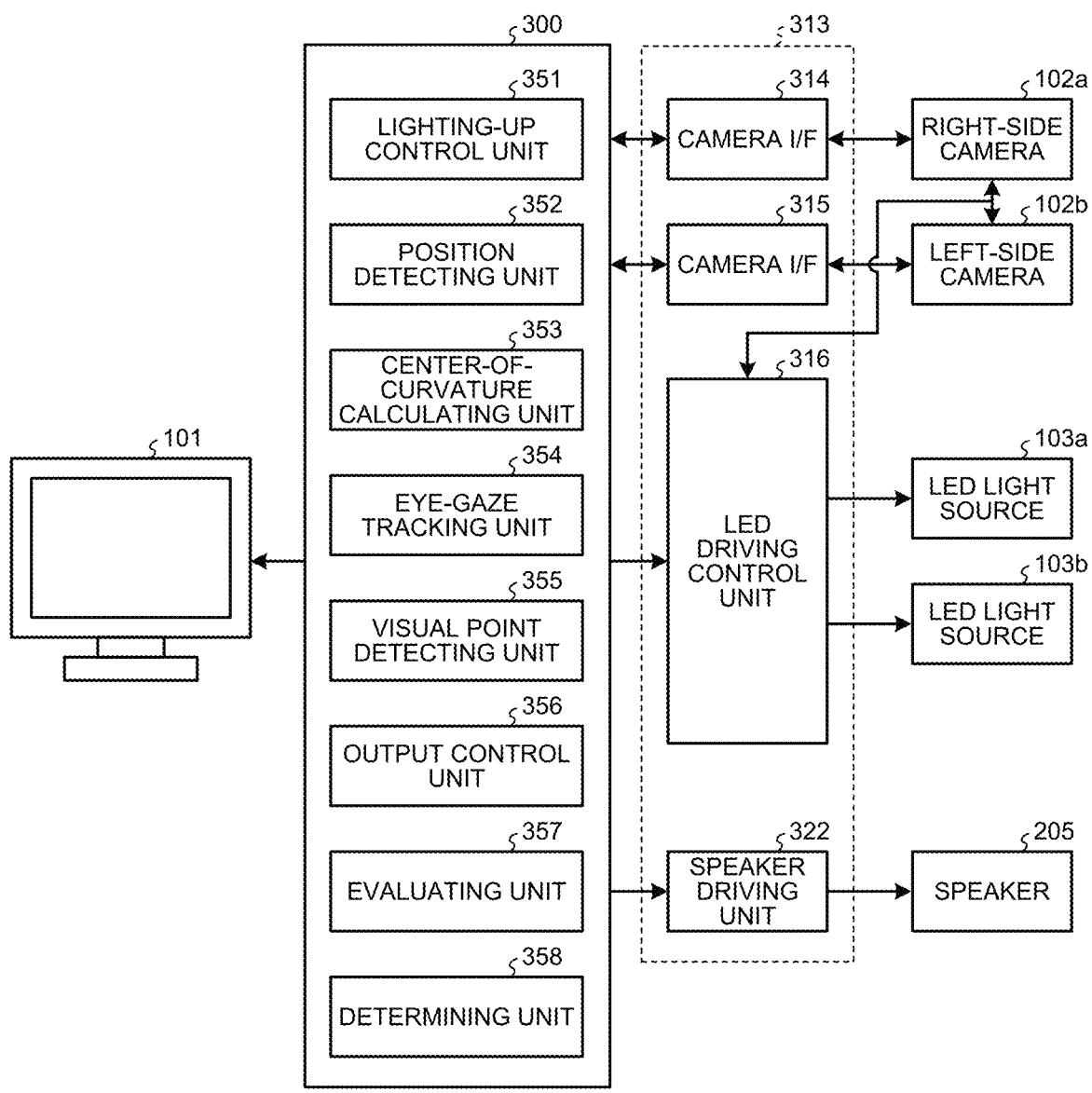
FIG. 6 is a block diagram illustrating an example of the detailed functions of each constituent element illustrated in FIG. 5.

FIG. 6 is a block diagram illustrating an example of the detailed functions of each constituent element illustrated in FIG. 5. As illustrated in FIG. 6, the display unit 101 and the driving/IF unit 313 are connected to the control unit 300.

The driving/IF unit 313 includes camera IFs 314 and 315, an LED driving control unit 316, and a speaker driving unit 322.

To the driving/IF unit 313, the right-side camera 102a and the left-side camera 102b are connected via the camera IFs 314 and 315, respectively. When the cameras are driven using the driving/IF unit 313, the test subject is captured. From the right-side camera 102a, a frame synchronization signal is output to the left-side camera 102b and the LED driving control unit 316. As a result, the LED light sources 103a and 103b are turned on and accordingly images from the cameras on the right and left sides are incorporated.

The speaker driving unit 322 drives the speaker 205. Meanwhile, the evaluation device 100 can also include an interface (a printer IF) for establishing connection with a printer functioning as a printing unit. Alternatively, a printer can be incorporated inside the evaluation device 100.

The control unit 300 controls the entire evaluation device 100. The control unit 300 includes a lighting-up control unit 351, a position detecting unit 352, a center-of-curvature calculating unit 353, an eye-gaze tracking unit 354, a visual point detecting unit 355, an output control unit 356, an evaluating unit 357, and a determining unit 358. As far as the eye-gaze tracking device is concerned, it is sufficient to include at least the lighting-up control unit 351, the position detecting unit 352, the center-of-curvature calculating unit 353, the eye-gaze tracking unit 354, and the determining unit 358. Moreover, as far as the corneal reflex position detection device is concerned, it is sufficient to include at least the lighting-up control unit 351 and the position detecting unit 352.

The constituent elements of the control unit 300 (i.e., the lighting-up control unit 351, the position detecting unit 352, the center-of-curvature calculating unit 353, the eye-gaze tracking unit 354, the visual point detecting unit 355, the output control unit 356, the evaluating unit 357, and the determining unit 358) can be implemented using software (computer programs); or can be implemented using hardware circuitry; or can be implemented using a combination of software and hardware circuitry.

If a computer program is used for implementing the constituent elements, that computer program is recorded as an installable file or an executable file in a computer-readable recording medium such as a compact disk read only memory (CD-ROM), a flexible disk (FD), a compact disk recordable (CD-R), or a digital versatile disk (DVD); and is provided as a computer program product. Alternatively, the computer program can be stored in a downloadable manner in a computer connected to a network such as the Internet. Still alternatively, the computer program can be distributed via a network such as the Internet. Still alternatively, the computer program can be stored in advance in a ROM.

The lighting-up control unit 351 controls the lighting up of the LED light sources 103a and 103b using the LED driving control unit 316. For example, the lighting-up control unit 351 performs control to ensure that the LED light sources 103a and 103b are turned on at mutually different timings. The difference (in the period of time) between the timings can be set in advance as, for example, the period of time within which the movement of the line of sight of the test subject does not affect the eye-gaze tracking result.

The position detecting unit (a pupil detecting unit, a corneal reflex detecting unit) 352 detects, from an image of the eye as taken by a stereo camera, a pupil area indicating the pupil and a corneal reflex area indicating the corneal reflex. Moreover, based on the pupil area, the position detecting unit 352 calculates the position of the pupil center indicating the center of the pupil. For example, the position detecting unit 352 selects a plurality of points present on the contour of the pupil area, and calculates the center of the circle passing through the selected points as the position of the pupil center. In an identical manner, based on the corneal reflex area, the position detecting unit 352 calculates the position of the corneal reflex center indicating the center of the corneal reflex. Meanwhile, the position detecting unit 352 can have separate parts for performing a pupil-related detection and for performing a corneal reflex-related detection.

The position detecting unit 352 enlarges, in a stepwise manner in an image of the eye, the target area for detection based on the center position of the pupil; and detects whether or not a high-luminance area is present that has the luminance to be equal to or higher than a predetermined luminance threshold value. Herein, an image of the eye includes, for example, a plurality of pixels arranged in a matrix-like manner. If a high-luminance area is detected, then the position detecting unit 352 calculates the dimensions of the high-luminance area. If the calculated dimensions of the high-luminance area are equal to or smaller than a predetermined dimensions threshold value, then the position detecting unit 352 determines that the high-luminance area represents the corneal reflex area.

If a high-luminance area is present on a continuing basis on the outside of the target area for detection, then the position detecting unit 352 calculates the dimensions of the high-luminance area including the portion present on the outside of the target area for detection. The position detecting unit 352 calculates the dimensions of the high-luminance area that is present on a continuing basis on the outside of the target area for detection, and enlarges the target area for detection. Then, with respect to the area for which the determination about whether or not the luminance is equal to or higher than the luminance threshold value was performed at the time of detection of the pre-enlargement target area for detection, the position detecting unit 352 does not perform that determination.

About whether or not the luminance is equal to or higher than the luminance threshold value, the position detecting unit 352 performs the determination for each pixel. Regarding the pixels that are neighboring the pixels determined to have the luminance to be equal to or higher than the luminance threshold value, the position detecting unit 352 determines whether or not the luminance of the neighboring pixels is consecutively equal to or higher than the luminance threshold value. With that, the position detecting unit 352 detects the range of the high-luminance area. Then, the position detecting unit 352 enlarges the target area for detection in one direction with reference to the center position of the pupil. In this case, the one direction corresponds to the direction toward the light source position from the visual point of the test subject at the time of capturing the image.

The determining unit 358 determines the detection state of the pupil area. For example, based on the luminance and the dimensions of the pupil area, the determining unit 358 determines whether the pupil area is detected in a normal way. Herein, based on the roundness of the pupil area, the determining unit 358 determines whether the pupil area is detected in a normal way.

Meanwhile, if the detection accuracy of the pupil area is high and the detection state of the pupil area need not be taken into account, the determining unit 358 need not perform the determination.

The center-of-curvature calculating unit 353 calculates the center of corneal curvature from the straight line joining the virtual light source position and the center of the corneal reflex. For example, the center-of-curvature calculating unit 353 calculates, as the center of the corneal curvature, such a position on the straight line that is at a predetermined distance from the center of the corneal reflex. Herein, the predetermined distance can be set in advance from the radius of curvature of the standard cornea.

Since there are individual differences in the radius of curvature of the cornea, if the center of corneal curvature is calculated using a predetermined value, there is a possibility that the error becomes large. Hence, the center-of-curvature calculating unit 353 can calculate the center of corneal curvature by taking into account the individual differences. In that case, firstly, using the pupil center and the center of the corneal reflex calculated when the test subject is made to gaze at the target position, the center-of-curvature calculating unit 353 calculates the point of intersection of the straight line joining the pupil center and the target position and the straight line joining the center of the corneal reflex and the virtual light source position. Then, the center-of-curvature calculating unit 353 calculates the distance between the pupil center and the calculated point of intersection and, for example, stores the distance in the memory unit 150.

The target position is set in advance, and it serves the purpose as long as the target position enables calculation of three-dimensional global coordinate values. For example, the center position of the display screen 201 (the origin of the three-dimensional global coordinates) can be set as the target position. In that case, for example, the output control unit 356 displays, at the target positon (center) on the display screen 201, an image (target image) that causes the test subject to gaze at. As a result, the test subject can be made to gaze at the target position.

Regarding the target image, as long as the test subject can be made to give attention, any type of image can be used. For example, an image in which the display form such as the luminance or the color undergoes changes can be used as the target image, or an image in which the display form is different than other areas can be used as the target image.

Meanwhile, the target position is not limited to the center of the display screen 201, and can be set to any arbitrary position. If the center of the display screen 201 is set as the target position, then the distance to an arbitrary end portion of the display screen 201 becomes the shortest. Hence, for example, the measurement error during eye-gaze tracking can be reduced further.

The operations up to the calculation of the distance are performed in advance before the start of, for example, the actual eye-gaze tracking. During the actual eye-gaze tracking, the center-of-curvature calculating unit 353 calculates, as the center of the corneal curvature, the position at which the distance from the pupil center on the straight line joining the virtual light source position and the center of corneal reflex becomes equal to the distance calculated in advance. Herein, the center-of-curvature calculating unit 353 is equivalent to a calculating unit that calculates the center of the corneal curvature from the virtual light source position; the predetermined position indicating the target image in the display unit; the position of the pupil center; and the position of the center of the corneal reflex.

The eye-gaze tracking unit 354 detects the eye gaze of the test subject according to the pupil center and the center of the corneal curvature. For example, the eye-gaze tracking unit 354 detects, as the eye-gaze direction of the test subject, the direction from the center of the corneal curvature to the pupil center.

The visual point detecting unit 355 detects the visual point of the test subject according to the detected eye-gaze direction. For example, the visual point detecting unit 355 detects the visual point (point of regard) representing the point in the display screen 201 at which the test subject gazes. For example, the visual point detecting unit 355 detects, as the point of regard of the test subject, the point of intersection between an eye-gaze vector and the XY plane expressed by the three-dimensional global coordinate system as illustrated in FIG. 4.

The output control unit 356 controls the output of a variety of information to the display unit 101 and the speaker 205. For example, the output control unit 356 performs control to output the target image to the target position in the display unit 101. Moreover, the output control unit 356 controls the output of evaluation images and evaluation results, which are obtained by the evaluating unit 357, to the display unit 101.

As long as the evaluation images are obtained according to the evaluation operation performed based on the eye-gaze (visual point) tracking result, it serves the purpose. For example, in the case of evaluating developmental disorders, evaluation images including images drawing the attention of the test subject (such as geometric pattern images) and other types of images (such as human images) can be used.

Moreover, the output control unit 356 displays, in the display unit 101, state information (indicator) indicating the detection state of at least either the pupil area or the corneal reflex area. Regarding the method for displaying the state information, the details are given later.

The evaluating unit 357 performs an evaluation operation based on the evaluation images and on the point of regard detected by the visual point detecting unit 355. For example, in the case of evaluating developmental disorders, the evaluating unit 357 analyzes the evaluation images and the point of regard, and evaluates whether or not the test subject having any developmental disorder gazed at the images drawing his or her attention.

Figure 7:
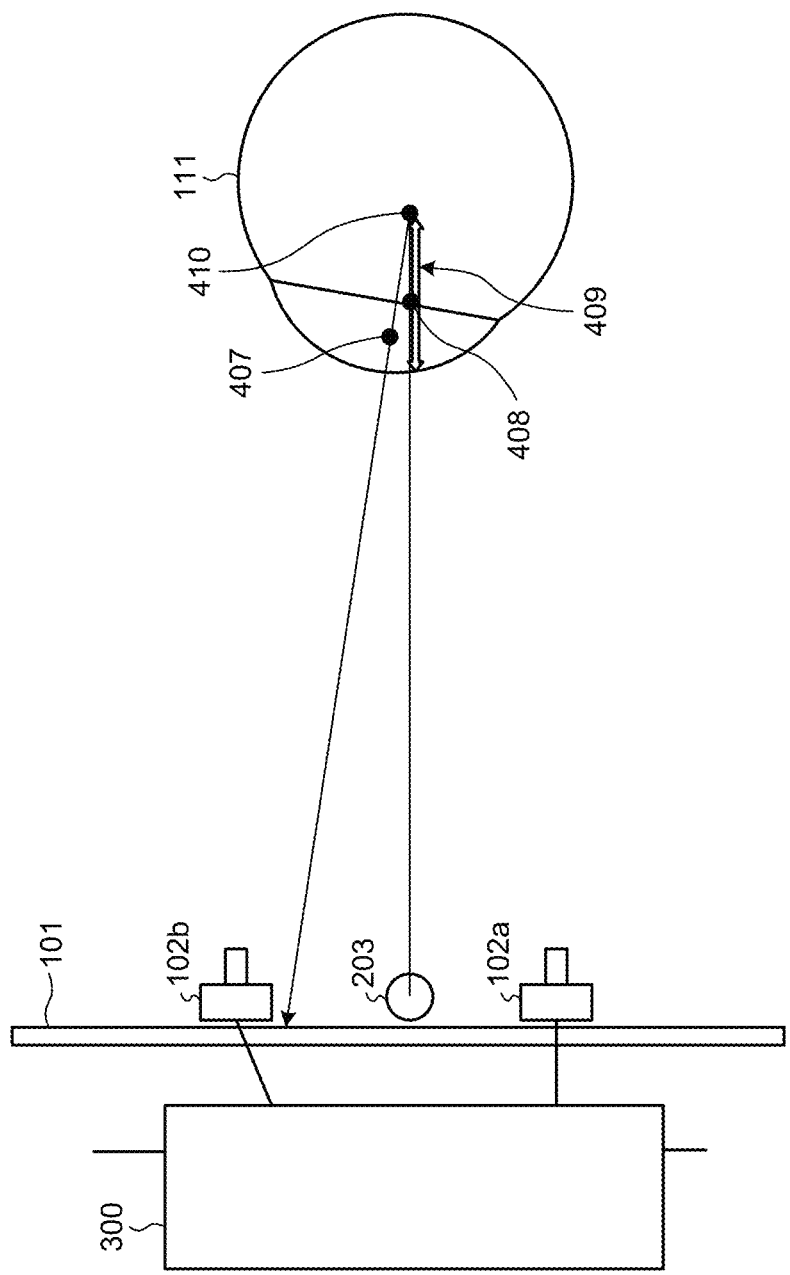
FIG. 7 is a diagram for explaining the outline of the operations performed under the assumption of using a single light source.

FIG. 7 is a diagram for explaining the outline of the operations performed under the assumption of using a single light source. Herein, the constituent elements explained with reference to FIGS. 3 to 6 are referred to by the same reference numerals, and their explanation is not given again. In the example illustrated in FIG. 7, a single LED light source 203 is used in place of the two LED light sources 103a and 103b.

A pupil center 407 and a corneal reflex center 408 represent the center of the pupil and the center of the corneal reflex point, respectively, that are detected when the single LED light source 203 is turned on. A corneal curvature radius 409 represents the distance from the corneal surface to a corneal curvature center 410. Herein, although the LED light source 203 is assumed to be configured using a single LED, it can alternatively be configured by arranging a combination of a few small LEDs at one position.

Figure 8:
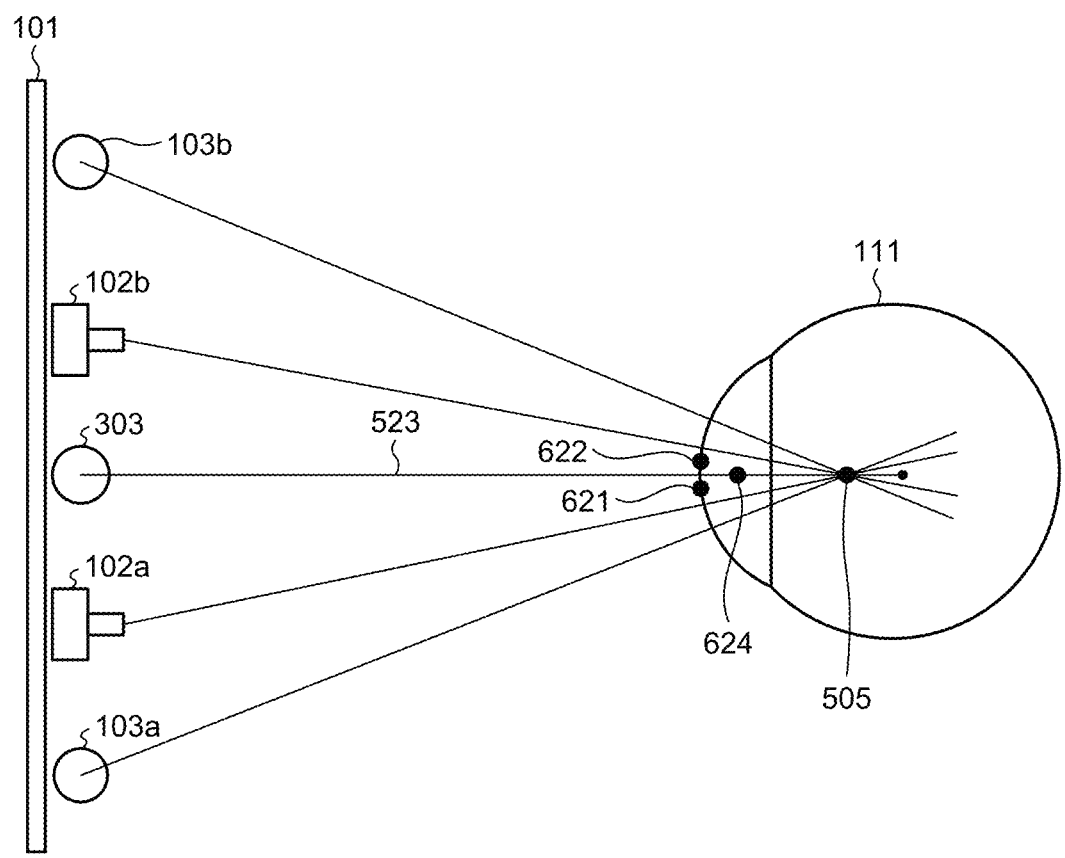
FIG. 8 is a diagram for explaining the outline of the operations performed in the evaluation device according to the embodiment.

FIG. 8 is a diagram for explaining the outline of the operations performed in the evaluation device 100 according to the present embodiment. Herein, the constituent elements explained with reference to FIGS. 3 to 6 are referred to by the same reference numerals, and their explanation is not given again.

A corneal reflex point 621 represents the corneal reflex point in the image captured by the left-side camera 102b. A corneal reflex point 622 represents the corneal reflex point in the image captured by the right-side camera 102a. In the present embodiment, the right-side camera 102a and the LED light source 103b meant for the right-side camera as well as the left-side camera 102b and the LED light source 103a meant for the left-side camera are, for example, in the bilaterally symmetrical positional relationship with respect to the straight line passing through the intermediate position of the right-side camera 102a and the left-side camera 102b. For that reason, it can be considered that a virtual light source 303 is present at the intermediate position between the right-side camera 102a and the left-side camera 102b (i.e., at the virtual light source position). A corneal reflex point 624 represents the corneal reflex point corresponding to the virtual light source 303. The coordinate values of the corneal reflex point 621 and the coordinate values of the corneal reflex point 622 are converted using conversion parameters meant for converting the coordinate values of the left-side camera and the right-side camera into three-dimensional global coordinates, whereby the global coordinate values of the corneal reflex point 624 can be calculated. On a straight line 523 joining the virtual light source 303 and the corneal reflex point 624, a curvature center 505 is present. Thus, the light source illustrated in FIG. 7 enables performing visual point detection in an identical manner to the eye-gaze tracking method performed at one position.

Meanwhile, the positional relationship between the right-side camera 102a and the left-side camera 102b as well as the positional relationship between the LED light sources 103a and 103b is not limited to the positional relationship mentioned above. Alternatively, for example, each positional relationship can be bilaterally symmetrical with respect to the same straight line; or the right-side camera 102a and the left-side camera 102b need not be present on the same straight line on which the LED light sources 103a and 103b are present.

Figure 9:
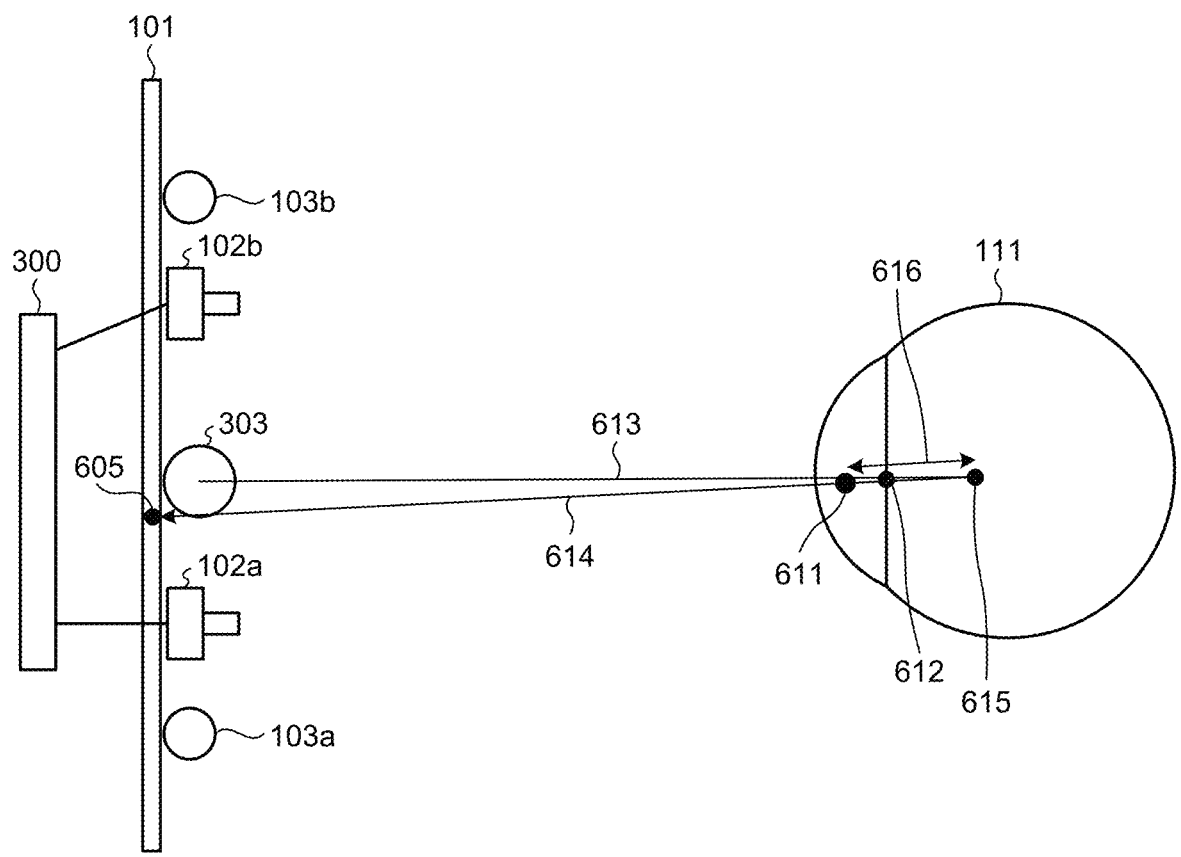
FIG. 9 is a diagram for explaining a calculation operation for calculating the distance between the pupil center position and the corneal curvature center position.

FIG. 9 is a diagram for explaining a calculation operation for calculating the corneal curvature center position and the distance between the pupil center position and the corneal curvature center position, before performing visual point detection (eye-gaze tracking). Herein, the constituent elements explained with reference to FIGS. 3 to 6 are referred to by the same reference numerals, and their explanation is not given again.

A target position 605 represents the position for outputting the target image at a point in the display unit 101 and making the test subject stare at the target image. In the present embodiment, the center position of the screen of the display unit 101 is treated as the target position 605. A straight line 613 represents the straight line joining the virtual light source 303 and a corneal reflex center 612. A straight line 614 represents the straight line joining the target position 605 (the point of regard), at which the test subject stares, and a pupil center 611. A corneal curvature center 615 represents the point of intersection between the straight lines 613 and 614. The center-of-curvature calculating unit 353 calculates and stores a distance 616 between the pupil center 611 and the corneal curvature center 615.

Figure 10:
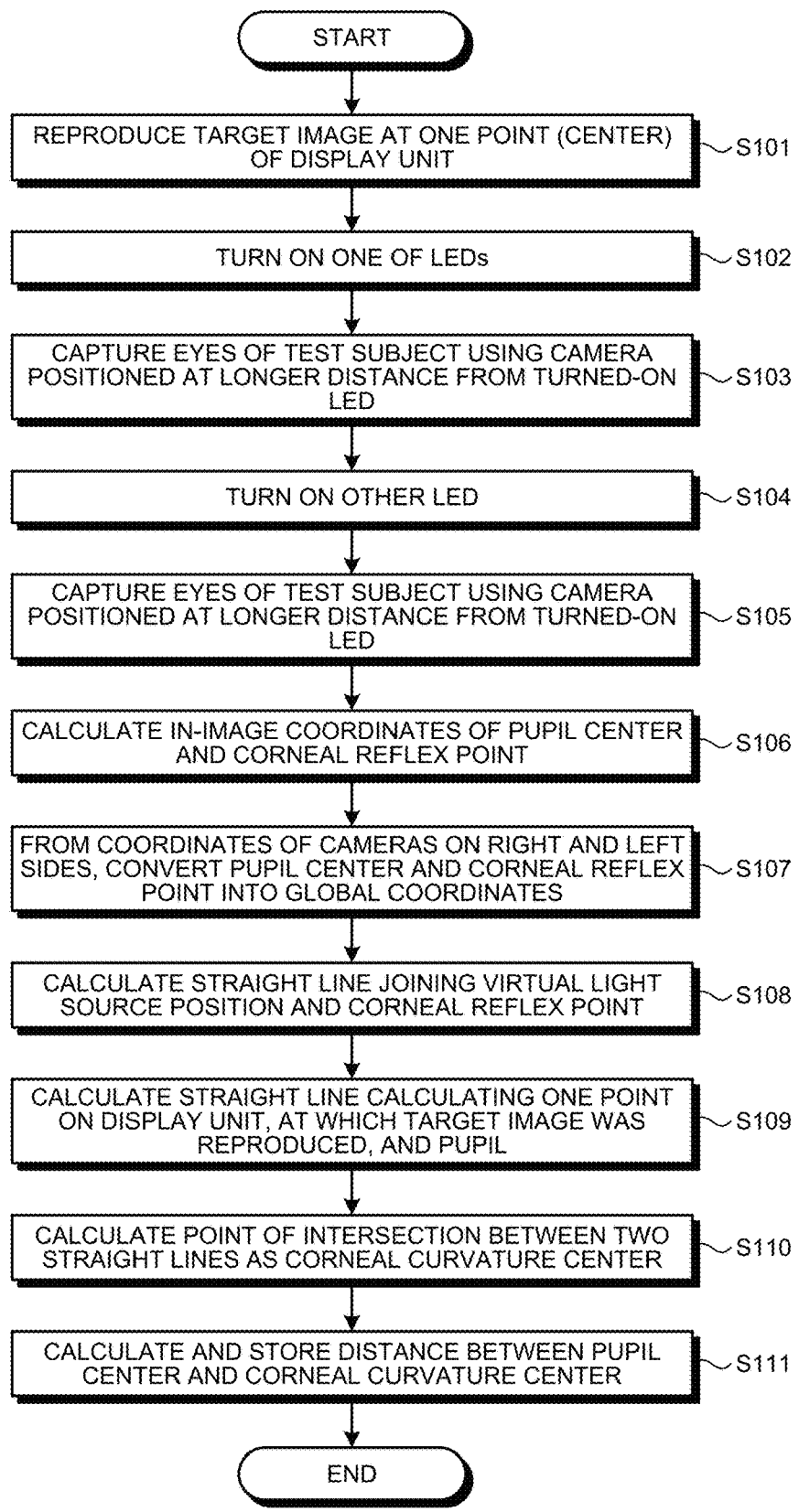
FIG. 10 is a flowchart for explaining an example of the calculation operation according to the present embodiment.

FIG. 10 is a flowchart for explaining an example of the calculation operation according to the present embodiment.

Firstly, the output control unit 356 reproduces the target image at a point on the screen of the display unit 101 (Step S101), and makes the test subject stare at that point. Then, the lighting-up control unit 351 uses the LED driving control unit 316 to turn on one of the LED light sources 103a and 103b toward the eyes of the test subject (Step S102). The control unit 300 captures the eyes of the test subject using one of the two cameras (the right-side camera 102a and the left-side camera 102*b*) that is at a longer distance from the turned-on LED light source (Step S103). Subsequently, the lighting-up control unit 351 turns on the remaining LED light source from the LED light sources 103*a* and 103*b* toward the eyes of the test subject (Step S104). The control unit 300 captures the eyes of the test subject using one of the two cameras that is at a longer distance from the turned-on LED light source (Step S105).

Meanwhile, there is no need to stop capturing of the camera other than the camera positioned at a longer distance from the turned-on LED light source. That is, it serves the purpose as long as the eyes of test subject are captured using at least the camera positioned at a longer distance from the turned-on LED light source and the captured images are usable in calculating the coordinates.

With the emission of light from the LED light source 103*a* or the LED light source 103*b*, the pupil portion (the pupil area) is detected as a dark portion (dark pupil). Moreover, as the reflection of LED emission, a virtual image of the corneal reflex is generated and the corneal reflex point (the corneal reflex center) is detected as a bright portion. That is, the position detecting unit 352 detects the pupil portion from the captured image and calculates the coordinates indicating the position of the pupil center. For example, the position detecting unit 352 detects, as the pupil portion, the area that includes the darkest portion in a certain area including the eye and that has the brightness to be equal to or lower than a predetermined brightness; and detects, as the corneal reflex, the area that includes the brightest portion and that has the brightness to be equal to or higher than the predetermined brightness. Furthermore, the position detecting unit 352 detects the corneal reflex portion (the corneal reflex area) from the captured image, and calculates the coordinates indicating the position of the corneal reflex center. Meanwhile, the position detecting unit 352 calculates the coordinate values with respect to the image captured by each of the two cameras on the right and left sides (Step S106).

Meanwhile, in order to obtain three-dimensional global coordinates, the two cameras on the right and left sides are subjected to camera calibration in advance according to the stereo calibration method, and a conversion parameter is calculated. As far as the stereo calibration method is concerned, it is possible to implement any conventional method including, for example, the method disclosed in "R. Y. Tsai, 'A versatile camera calibration technique for high-accuracy 3D machine vision metrology using off-the-shelf TV cameras and lenses,' IEEE Journal of Robotics and Automation, vol. RA-3, no. 4, 1987.".

The position detecting unit 352 uses the conversion parameter and, from the coordinates of the two cameras on the right and left sides, converts the pupil center and the corneal reflex center into three-dimensional global coordinates (Step S107). For example, the position detecting unit 352 sets, as the coordinates of the left-side camera, the coordinates obtained from the image captured by the left-side camera 102*b* when the LED light source 103*a* is turned on; sets, as the coordinates of the right-side camera, the coordinates obtained from the image captured by the right-side camera 102*a* when the LED light source 103*b* is turned on; and performs conversion of coordinates to three-dimensional global coordinates using the conversion parameter. The resultant global coordinate value corresponds to the global coordinate values obtained from the images captured by the two cameras on the right and left sides under the assumption that light is emitted from the virtual light source 303. The center-of-curvature calculating unit 353 obtains the straight line joining the global coordinates of the obtained corneal reflex center and the global coordinates of the center position of the virtual light source 303 (Step S108). Then, the center-of-curvature calculating unit 353 calculates the straight line joining the global coordinates of the center of the target image, which is displayed at a point on the screen of the display unit 101, and the global coordinates of the pupil center (Step S109). Subsequently, the center-of-curvature calculating unit 353 obtains the point of intersection between the straight line calculated at Step S108 and the straight line calculated at Step S109, and sets the point of intersection as the corneal curvature center (Step S110). Then, the center-of-curvature calculating unit 353 calculates the distance between the pupil center at that time and the corneal curvature center, and stores the distance in the memory unit 150 (Step S111). The stored distance is then used in calculating the corneal curvature center at the time of performing subsequent visual point (eye-gaze) detection.

The distance between the pupil center and the corneal curvature center at the time of staring at a point in the display unit 101 during the calculation operation is kept constant within the range of detecting the visual point in the display unit 101. The distance between the pupil center and the corneal curvature center can be obtained from the average of the overall values calculated during the reproduction of the target images, or can be obtained from the average of some of the values calculated during the reproduction of the target images.

Figure 11:
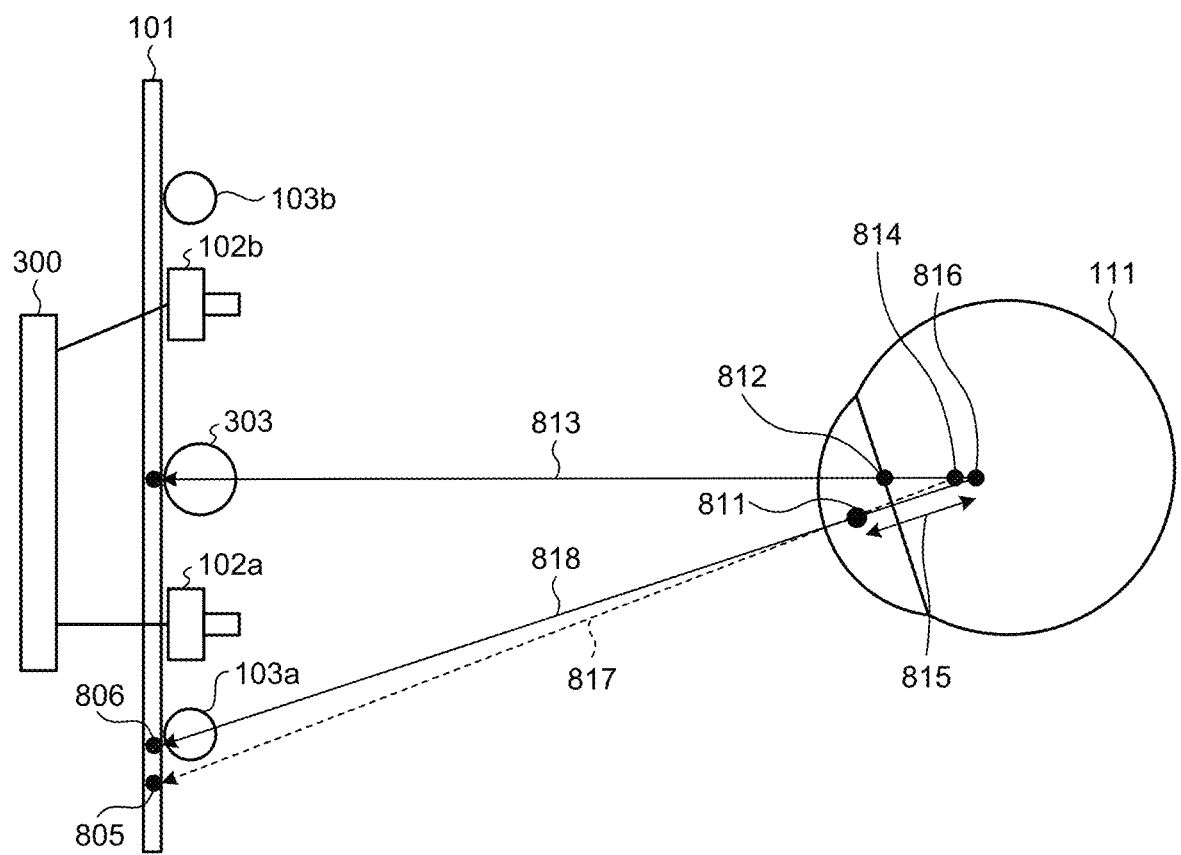
FIG. 11 is a diagram illustrating a method for calculating the position of the corneal curvature center using the distance obtained in advance.

FIG. 11 is a diagram illustrating a method for calculating the position of the corrected corneal curvature center using the distance, obtained in advance, between the pupil center and the corneal curvature center when visual point detection is performed. A point of regard 805 represents the point of regard obtained from the corneal curvature center that is calculated using the standard radius of curvature. A point of regard 806 represents the point of regard obtained from the corneal curvature center that is calculated using the distance obtained in advance.

A pupil center 811 and a corneal reflex center 812 represent the position of the pupil center and the position of the corneal reflex center, respectively, that are calculated during visual point detection. A straight line 813 represents the straight line joining the virtual light source 303 and the corneal reflex center 812. A corneal curvature center 814 represents the position of the corneal curvature center calculated from the standard radius of curvature. A distance 815 represents the distance between the pupil center and the corneal curvature center calculated during the calculation operation performed in advance. A corneal curvature center 816 represents the position of the corneal curvature center that is calculated using the distance obtained in advance. The corneal curvature center 816 is obtained from the fact that the corneal curvature center is present on the straight line 813 and the fact that the distance between the pupil center and the corneal curvature center is the distance 815. As a result, an eye gaze 817 that is calculated in the case of using the standard radius of curvature is corrected to an eye gaze 818. Moreover, the point of regard on the screen of the display unit 101 is corrected from the point of regard 805 to the point of regard 806.

Figure 12:
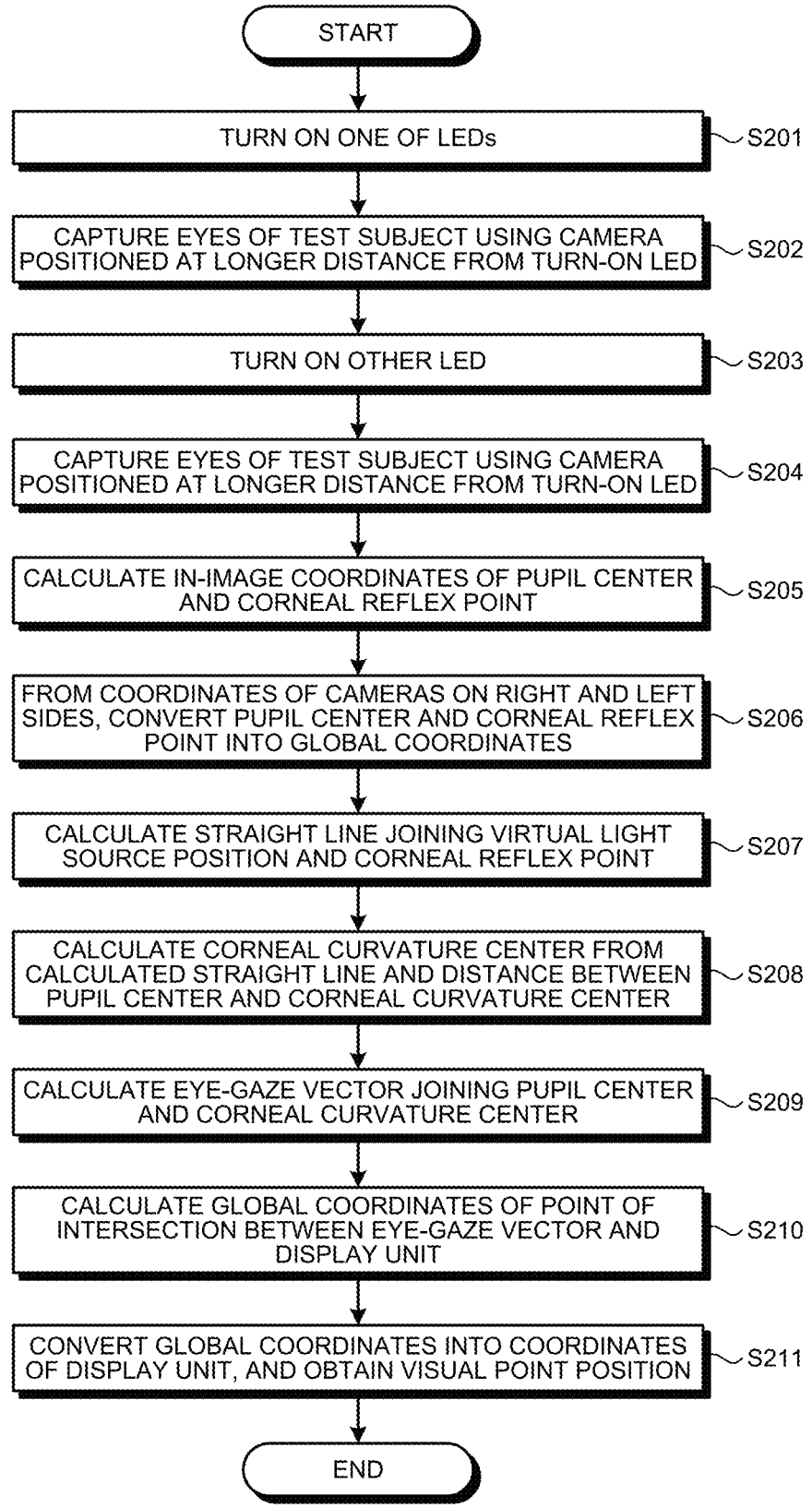
FIG. 12 is a flowchart for explaining an example of the eye-gaze tracking operation according to the present embodiment.

FIG. 12 is a flowchart for explaining an example of the eye-gaze tracking operation according to the present embodiment. For example, as the eye-gaze tracking operation performed during the evaluation operation using the evaluation image, the eye-gaze tracking operation illustrated in FIG. 12 can be performed. During the evaluation operation, other than implementing the steps illustrated in FIG. 12, the operation for displaying the evaluation image is performed, and the evaluation operation is performed by the evaluating unit 357 using the detection result of the point of regard.

The operations performed at Steps S201 to S207 are identical to the operations performed at Steps S102 to S108 illustrated in FIG. 10. Hence, that explanation is not given again.

The center-of-curvature calculating unit 353 calculates, as the corneal curvature center, the position that is on the straight line calculated at Step S207 and that has the distance from the pupil center to be equal to the distance obtained during the calculation operation performed in advance (Step S208).

The eye-gaze tracking unit 354 obtains the vector (eye gaze vector) joining the pupil center and the corneal curvature center (Step S209). That vector indicates the eye gazing direction in which the test subject is looking. The visual point detecting unit 355 calculates the three-dimensional global coordinate value of the point of intersection between the eye gazing direction and the screen of the display unit 101 (Step S210). That three-dimensional global coordinate value represents the coordinate value, expressed using global coordinates, of a point on the display unit 101 as stared by the test subject. The visual point detecting unit 355 converts the three-dimensional global coordinate value into a coordinate value (x, y) expressed in the two-dimensional coordinate system of the display unit 101 (Step S211). As a result, it becomes possible to calculate the visual point (point of regard) on the display unit 101 as stared by the test subject.

[Corneal Reflex Position Detection Method]

Given below is the explanation of the corneal reflex position detection method according to the present embodiment. In the present embodiment, the evaluation device 100 is used as, for example, a corneal reflex position detection device for detecting the position of the corneal reflex point of the eyes or an eye-gaze tracking device for tracking the eye gaze of the test subject. In the explanation given below, the evaluation device 100 is sometimes appropriately called the corneal reflex position detection device 100 or the eye-gaze tracking device 100.

Figure 13:
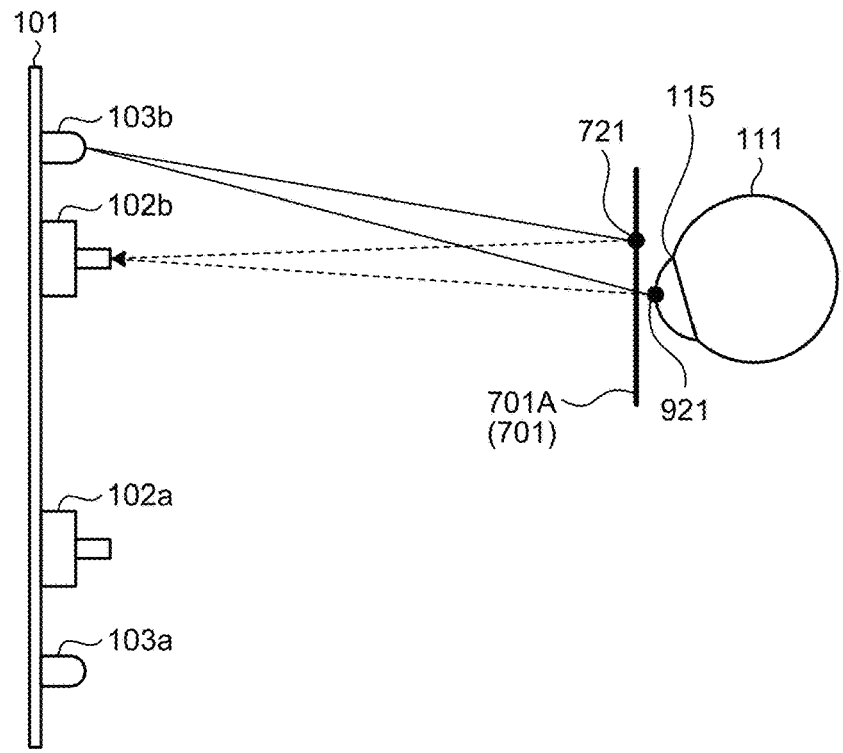
FIGS. 13 and 14 are diagrams illustrating examples of detecting the corneal reflex point of the test subject who is wearing a pair of eyeglasses.
Figure 14:
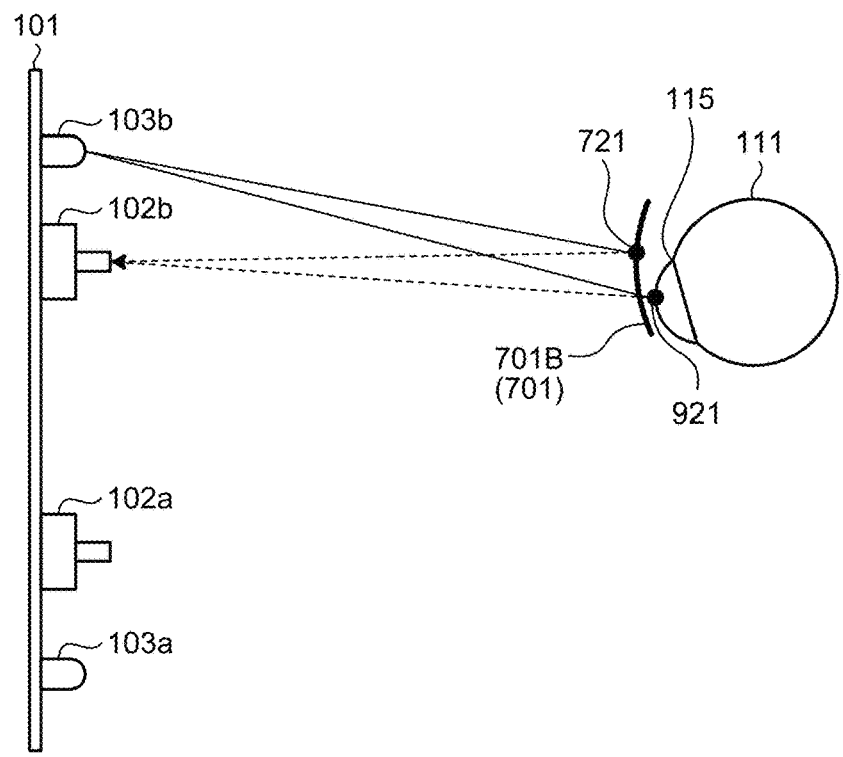

In the corneal reflex position detection method according to the present embodiment, the corneal reflex point of the test subject, who is wearing a pair of eyeglasses, is detected. FIGS. 13 and 14 are diagrams illustrating examples of detecting the corneal reflex point of the test subject who is wearing a pair of eyeglasses. In the explanation with reference to FIGS. 13 and 14 and beyond, the example is given with reference to the right eye of the test subject. However, the same explanation can be applicable in the case of detecting the left eye.

As illustrated in FIG. 13, when infrared light is emitted from the LED light source 103b toward the eye 111 of the test subject who is wearing a pair of eyeglasses having an eyeglass lens 701A; a corneal reflex point 921 and an eyeglass reflection point 721 in the eyeglass lens 701A (701) are captured by the left-side camera 102b. In an identical manner, as illustrated in FIG. 14, when infrared light is emitted from the LED light source 103b toward the eye 111 of the test subject who is wearing a pair of eyeglasses having an eyeglass lens 701B; the corneal reflex point (corneal reflex area) 921 and the eyeglass reflection point 721 in the eyeglass lens 701B (701) are captured by the left-side camera 102b.

In FIGS. 13 and 14 are illustrated the cases in which the eyeglass lenses 701 (701A and 701B) have difference curvature factors. When the test subject is wearing a pair of eyeglasses, the eyeglass reflection point 721 is formed at a random position depending on the curvature factor, the inclination, and the size of the eyeglass lenses 701. In contrast, the corneal reflex point 921 is present at a position close to the pupil center. Moreover, as illustrated in FIGS. 13 and 14, the eyeglass lenses 701 have a greater curvature factor than the eye. Hence, the eyeglass reflection point 721 has greater dimensions than the corneal reflex point 921. Meanwhile, as illustrated in FIGS. 13 and 14, in the eye 111, a curvature changing part 115 is present that represents the part in which the curvature factor of the cornea changes. If the corneal reflex point 921 is present on the outside of the curvature changing part 115, then it implies that the visual point cannot be correctly calculated.

Figure 15:
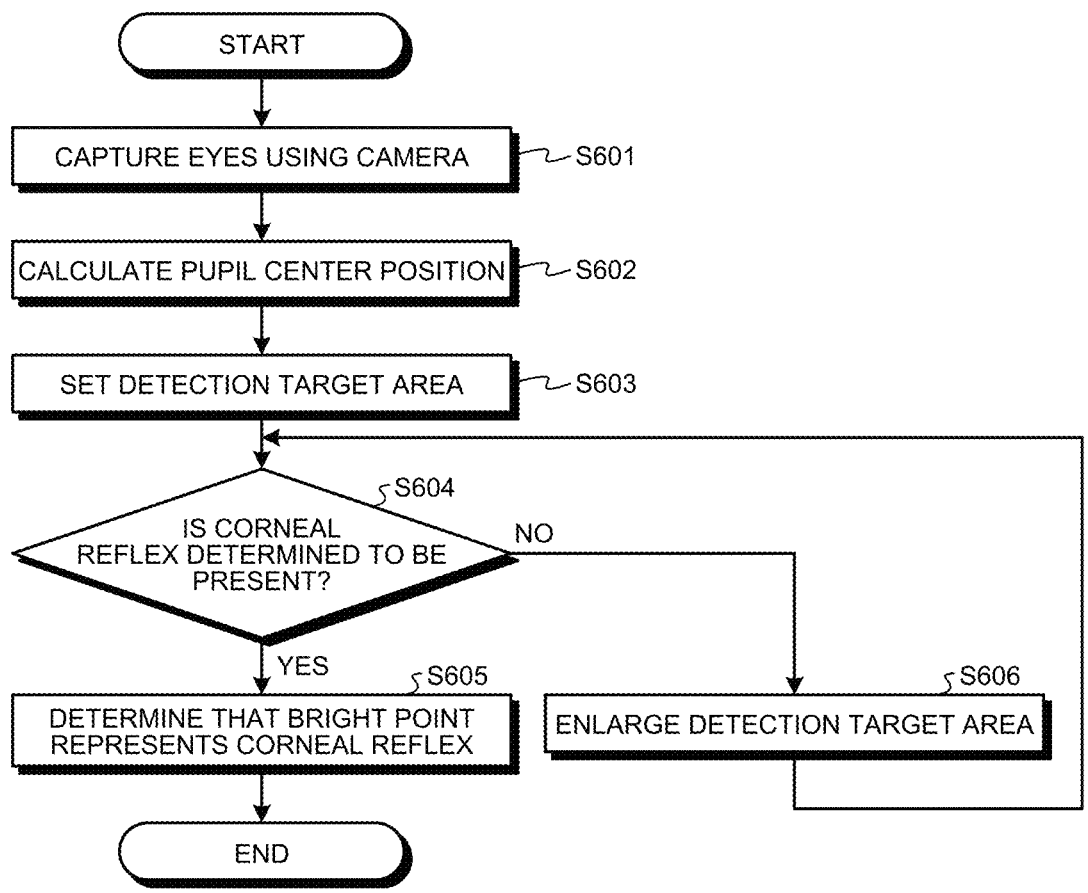
FIG. 15 is a flowchart for explaining an example of the corneal reflex position detection method according to the present embodiment.
Figure 16:
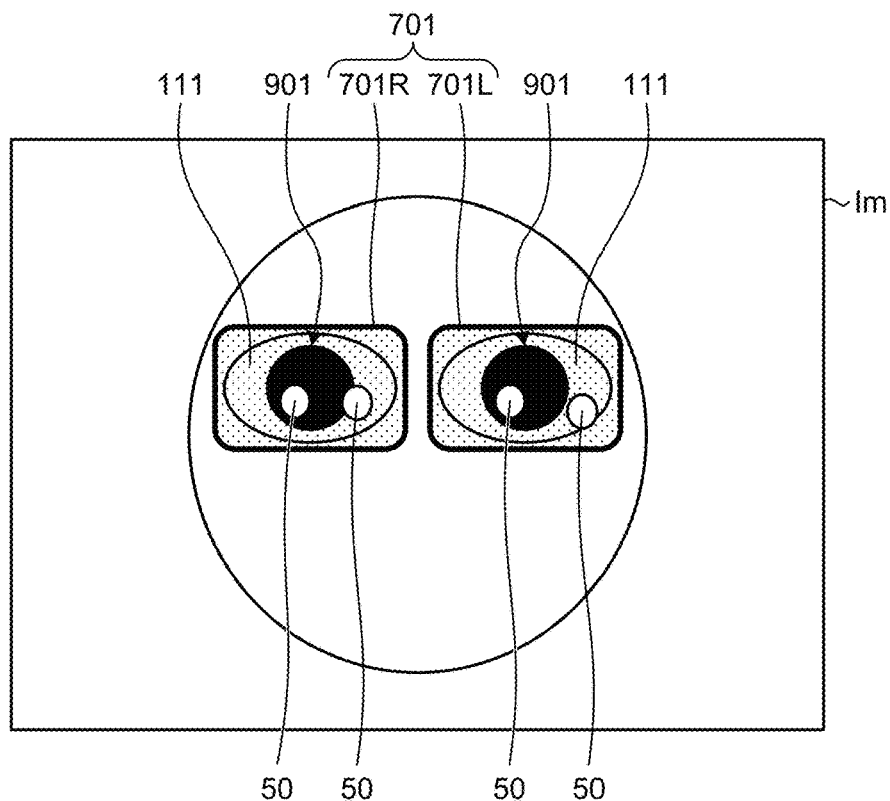
FIGS. 16 to 18 are diagrams for explaining a step in the corneal reflex position detection method.
Figure 17:
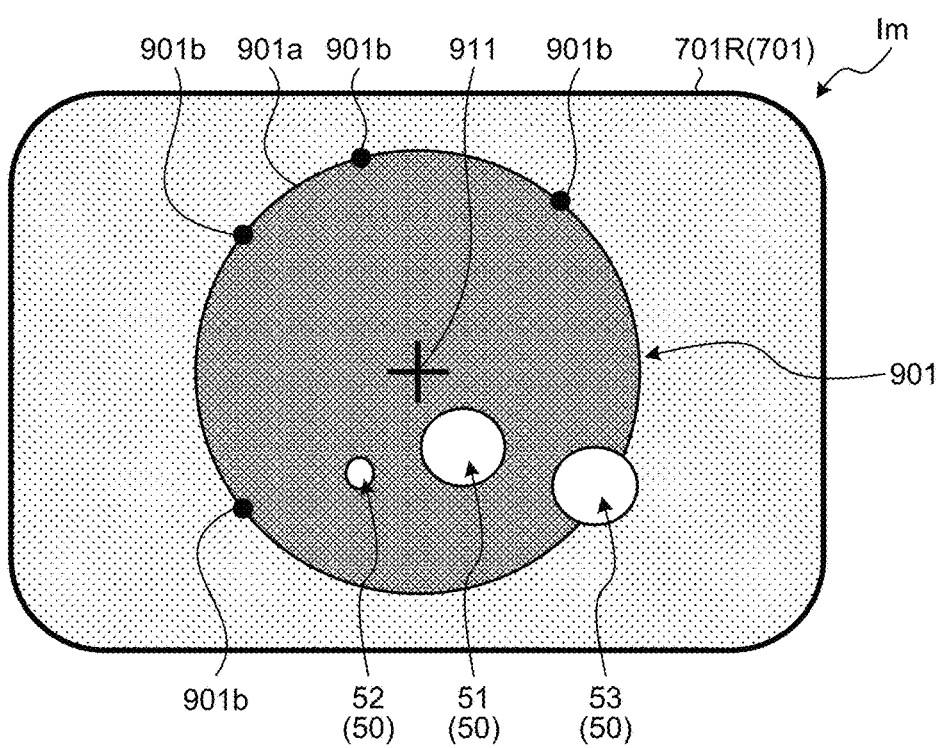
Figure 18:
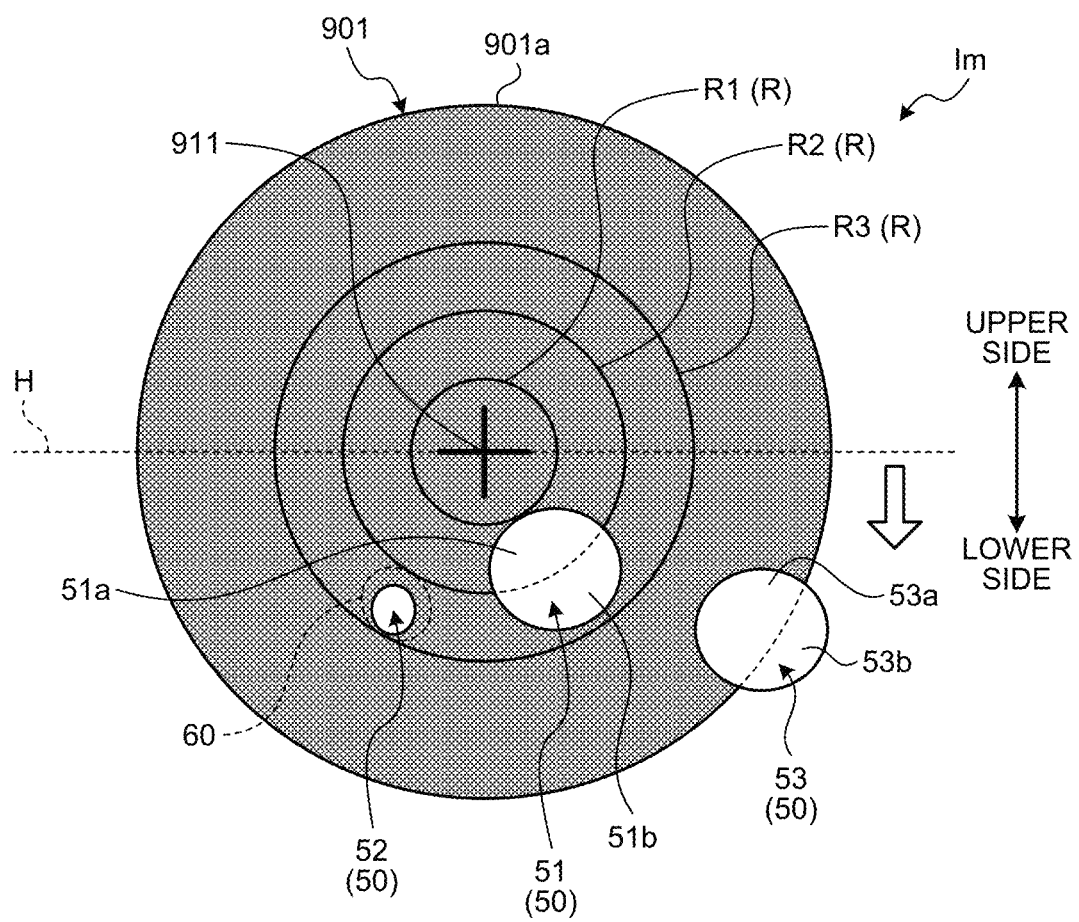

FIG. 15 is a flowchart for explaining an example of the corneal reflex position detection method according to the present embodiment. FIGS. 16 to 18 are diagrams for explaining a step in the corneal reflex position detection method. In the following example, the explanation is given about the case of using the two LED light sources 103a and 103b. However, the same explanation can be applicable in the case of using the single LED light source 203. Moreover, the corneal reflex position detection method can be implemented with respect to both eyes. In the following explanation, the example is given for implementing the corneal reflex position detection method with respect to the right eye. However, the same explanation can be applicable in the case of implementing the corneal reflex position detection method with respect to the left eye. Moreover, the corneal reflex position detection method can be implemented with respect to only one of the two eyes.

Firstly, infrared light is emitted from the LED light source 103a or the LED light source 103b toward the eyes 111 of the test subject, and then the eyes 111 of the test subject are captured using the right-side camera 102a or the left-side camera 102b (Step S601). FIG. 16 is a diagram illustrating an example of an image Im captured at Step S601. The image Im illustrated in FIG. 16 includes, for example, a plurality of pixels arranged in a matrix-like manner. In the image Im, the following is included: the two eyes 111 of the test subject wearing a pair of eyeglasses; a pupil 901; and the eyeglass lenses 701 (701L and 701R). Moreover, in the image Im, a plurality of bright points 50 are included. The bright points 50 are positioned in the image Im within the range of the eyes 111. In this state, it is difficult to distinguish whether the bright points 50 are the corneal reflex points 921 or the eyeglass reflection points 721. In that regard, in the present embodiment, the following process is followed for distinguishing between the corneal reflex point 921 and the eyeglass reflection point 721, and for detecting the corneal reflex point 921.

After the eye 111 of the test subject is captured, the position detecting unit 352 calculates the pupil center position (Step S602). FIG. 17 is a diagram illustrating, in an enlarged manner, the range of the eyeglass lens 710R for the right eye captured in the image Im. At Step S602, as illustrated in FIG. 17, the position detecting unit 352 selects, for example, a plurality of points 901b on a contour 901a of the pupil 901, and calculates the center of the circle passing through the selected points 901b as a pupil center position 911. Since the pupil 901 hardly reflects any light, it has the tendency of being lower in brightness as compared to the iris or the eyelid regardless of the surrounding environment. Thus, the position detecting unit 352 can detect the pupil 901 by, for example, detecting pixels having low luminance. Meanwhile, in the enlarged diagram of the image Im, a plurality of bright points 50 (51, 52, and 53) are included.

After the pupil center position 911 is calculated, the position detecting unit 352 sets the target area for detection that is to be used in detecting the corneal reflex point 921 (Step S603). FIG. 18 is a diagram illustrating, in an enlarged manner, the range of the pupil 901 of the right eye captured in the image Im. At Step S603, as illustrated in FIG. 18, the position detecting unit 352 sets a detection target area R with reference to the pupil center position 911. Firstly, the position detecting unit 352 sets, as a first detection target area R1, such an area in the image Im which is on the inside of the circle having a predetermined diameter centered on the pupil center position 911. In the case of setting the diameter (dimensions) of the first detection target area R1, the position detection unit 352 performs the setting using, for example, a reference value set in advance. Alternatively, the position detecting unit 352 can set, as a diameter of the first detection target area R1, the diameter of the circle having the dimensions equivalent to the dimensions threshold value. The first detection target area R1 includes a plurality of pixels arranged in a matrix-like manner on the inside of the circle.

Figure 19:
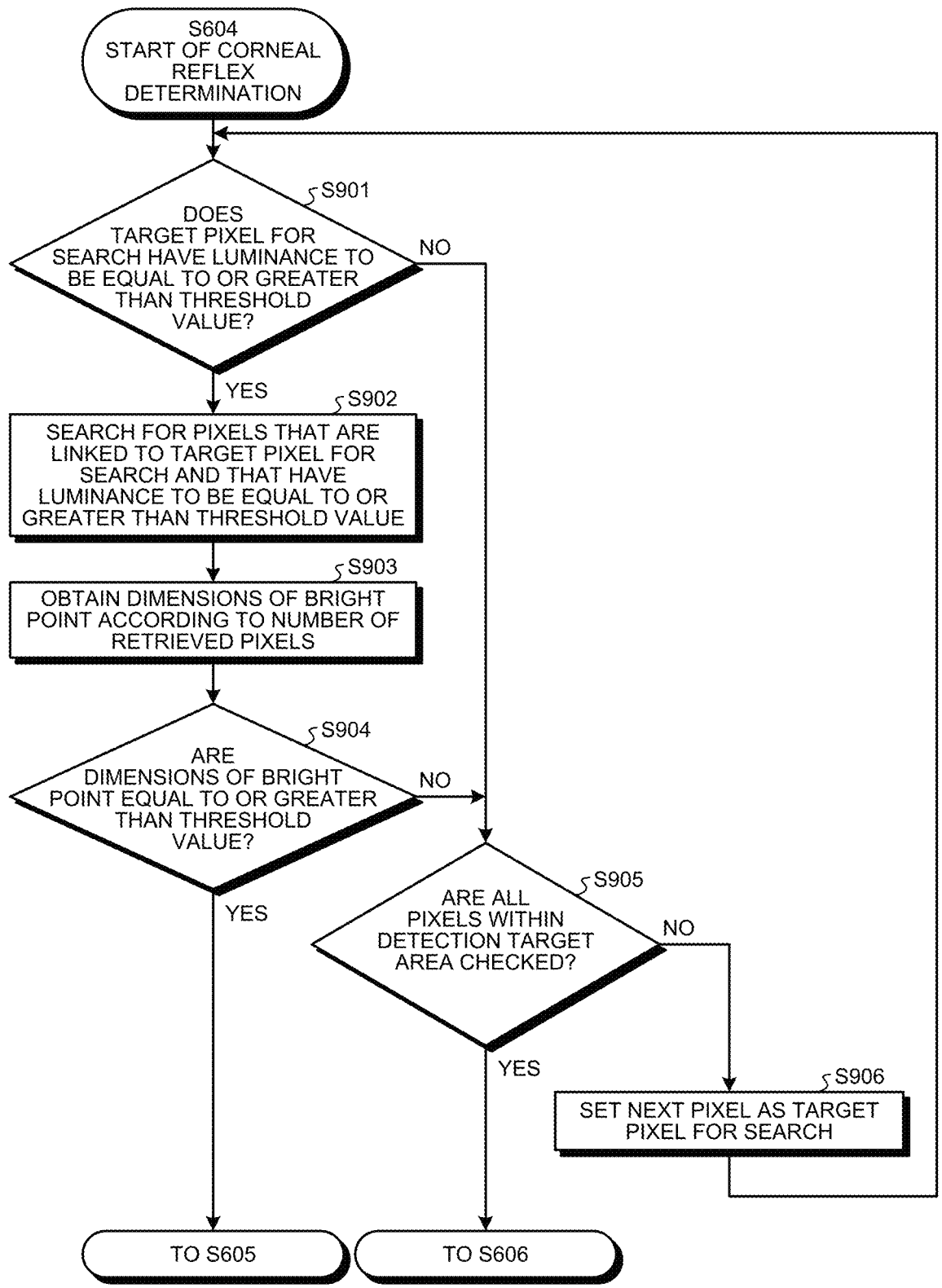
FIG. 19 is a flowchart for explaining an example of the determination operation performed at Step S604 illustrated in FIG. 15.

After the detection target area R (the first detection target area R1) is set, the position detecting unit 352 determines whether or not the corneal reflex point 921 is present within the detection target area R (Step S604). FIG. 19 is a flowchart for explaining an example of the determination operation performed at Step S604 illustrated in FIG. 15. As illustrated in FIG. 19, the position detecting unit 352 determines whether or not the pixels in the detection target area R (hereinafter, referred to as "target pixels for search") have the luminance to be equal to or greater than a luminance threshold value. The luminance threshold value can be set in advance using past detection results, experimental values, or simulation values. For example, the luminance of the areas representing the bright points 50 in the image Im can be measured in advance, and the luminance threshold value can be set with reference to the measured luminance. Herein, the position detecting unit 352 performs the determination with respect to each target pixel for search.

If it is determined that the luminance of the target pixel for search is equal to or greater than the luminance threshold value (Yes at Step S901), then the position detecting unit 352 determines whether or not there is a pixel that is linked to the concerned target pixel for search and that has the luminance to be equal to or greater than the luminance threshold value (Step S902). In the following explanation, a pixel having the luminance to be equal to or greater than the luminance threshold value is referred to as a "high luminance pixel". At Step S902, with respect to the neighboring pixels of the concerned target pixel for search that are neighboring in the vertical direction, the horizontal direction, and the diagonal directions; the position detecting unit 352 performs identical determination to the determination performed at Step S901, and detects whether or not any high luminance pixel is present. Moreover, also regarding each pixel determined to be a high luminance pixel, with respect to the neighboring pixels of the concerned high luminance pixel that are neighboring in the vertical direction, the horizontal direction, and the diagonal directions; the position detecting unit 352 performs identical determination to the determination performed at Step S901. In this case, regarding the pixels for which the determination is already performed, the position detecting unit 352 skips the determination operation. In this way, at Step S902, as a result consecutively performing the determination with respect to the neighboring pixels of each high luminance pixel that are neighboring in the vertical direction, the horizontal direction, and the diagonal directions; the position detecting unit 352 detects the range in which high luminance pixels are present. At Step S902, if any neighboring pixels to a high luminance pixel are present on the outside of the detection target area R, then the position detecting unit 352 performs the determination for high luminance pixels also with respect to the pixels on the outside of the detection target area R. An area that is detected as a set of such high luminance pixels (i.e., a high-luminance area) represents, for example, the area of a bright point 50 in the image Im. In the following explanation, a high-luminance area representing an area formed by a set of high luminance pixels is assumed to be a bright point 50.

After the range of high luminance pixels is detected, the position detecting unit 352 counts the number of detected high luminance pixels and calculates the dimensions of the bright point 50 (Step S903). After the dimensions of the bright point 50 are calculated, the position detecting unit 352 determines whether or not the calculated dimensions are equal to or smaller than a dimensions threshold value (Step S904). The dimensions threshold value can be set in advance using past detection results, experimental values, or simulation values. For example, the dimensions of the area representing the corneal reflex point 921 in the image Im can be obtained, and the dimensions threshold value can be set with reference to the obtained dimensions. If it is determined that the calculated dimensions are equal to or smaller than the dimensions threshold value (Yes at Step S904), then the system control proceeds to Step S605 illustrated in FIG. 15.

On the other hand, if it is determined that the calculated dimensions exceed the dimensions threshold value (No at Step S904) or if it is determined at Step S901 that the luminance of the target pixel for search is equal to or smaller than the luminance threshold value (No at Step S901), then the position detecting unit 352 determines whether or not the detection has been performed for all pixels in the detection target area R (Step S905). If it is determined that the detection has been performed for all pixels in the detection target area R (Yes at Step S905), then the position detecting unit 352 determines that the corneal reflex point 921 is not present in the detection target area R, and the system control proceeds to Step S606 illustrated in FIG. 15. However, if it is determined that the detection is not yet performed for all pixels in the detection target area R (No at Step S905), then the position detecting unit 352 sets a pixel for which the detection is not yet performed as the target pixel for search (Step S906), and again performs the operations from Step S901 onward.

Meanwhile, at Step S604 explained earlier, if it is determined that the calculated dimensions of the bright point 50 are equal to or smaller than the dimensions threshold value (Yes at Step S604), then the position detecting unit 352 determines that the bright point 50 represents the corneal reflex point 921 (Step S605). Thus, the corneal reflex point 921 is detected as a result of the determination performed at Step S605. Hence, the position detecting unit 352 ends the operation for detecting the corneal reflex point 921.

On the other hand, at Step S604 explained earlier, if it is determined that the detection has been performed for all pixels in the detection target area R and that the corneal reflex point 921 is not present in the detection target area R (No at Step S604), then the position detecting unit 352 performs an operation for enlarging the detection target area R (Step S606).

At Step S606, the position detecting unit 352 enlarges the detection target area R in the units of size corresponding to the diameter of the circle having the dimensions equivalent to the dimensions threshold value. Meanwhile, the position detecting unit 352 is not limited to perform the operation for enlarging the detection target area R in the units of size, and can alternatively enlarge the detection target area R by an enlargement width different from the abovementioned size. In the example illustrated in FIG. 18, the position detecting unit 352 enlarges the detection target area R from the first detection target area R1 to a second detection target area R2. After enlarging the detection target area R to the second detection target area R2, the position detecting unit 352 again performs the operation at Step S604. Thus, the position detecting unit 352 performs the operation at Step S604 while enlarging the detection target area R in a stepwise manner.

With reference to FIG. 18, the manner of performing the determination while enlarging the detection target area R in a stepwise manner is explained as a specific example associated with the flowchart explained earlier. As illustrated in FIG. 18, the position detecting unit 352 does not detect the high luminance pixels in the first detection target area R1, but enlarges the detection target area R to the second detection target area R2 and again performs the operation at Step S604.

The position detecting unit 352 performs determination with respect to the pixels present in the second detection target area R2 about whether or not the pixels have the luminance to be equal to or greater than the luminance threshold value (Step S901). For example, regarding the pixels constituting a first area 51a of the bright point 51, the position detecting unit 352 determines that the pixels are high luminance pixels (Yes at Step S901). The bright point 51 is positioned astride the second detection target area R2 and a third detection target area R3 formed on the outside of the second detection target area R2. When a single pixel constituting the first area 51a is detected as a high luminance pixel, the position detecting unit 352 determines, in a chain reaction, whether or not the neighboring pixels to the concerned high luminance pixel have the luminance to be equal to or greater than the luminance threshold value (Step S902). As a result, the determination about high luminance pixels is performed with respect to not only the pixels in the first area 51a of the bright point 51 but also the pixels corresponding to a second area 51b of the bright point 51 that protrudes into the third detection target area R3. Thus, in the bright point 51, although the second area 51b is positioned in the third detection target area R3, during the detection performed in the second detection target area R2, an area having high luminance pixels are detected.

Subsequently, the position detecting unit 352 obtains the dimensions of the bright point 51 by counting the number of high luminance pixels (Step S903), and determines whether or not the dimensions of the bright point 51 are equal to or smaller than a predetermined dimensions threshold value (Step S904). In FIG. 18, a circular threshold value area 60 having the dimensions equivalent to the dimensions threshold value is illustrated using a dashed line. However, the threshold value area 60 is not displayed in the actual image Im. As illustrated in FIG. 18, the dimensions of the bright point 51 are greater than the dimensions of the threshold value area 60. Hence, the position detecting unit 352 determines that the dimensions of the bright point 51 are greater than the dimensions threshold value (No at Step S904). Then, the position detecting unit 352 performs the determination with respect to all pixels in the second detection target area R2 (No at Step S905 and Yes at Steps S906 and S905), but does not detect any high luminance pixels. Hence, the position detecting unit 352 enlarges the detection target area R to the third detection target area R3 and again performs the operation at Step S604.

The position detecting unit 352 performs determination with respect to the pixels present in the third detection target area R3 about whether or not the pixels have the luminance to be equal to or greater than the luminance threshold value (Step S901). For example, regarding the pixels constituting the bright point 52, the position detecting unit 352 determines that the pixels are high luminance pixels (Yes at Step S901). When a single pixel constituting the bright point 52 is detected as a high luminance pixel, the position detecting unit 352 consecutively determines, whether or not the neighboring pixels to the concerned high luminance pixel have the luminance to be equal to or greater than the luminance threshold value (Step S902). Meanwhile, the third detection target area R3 includes the second area 51b of the bright point 51. Regarding the second area 51b, the determination is already performed at the time of performing the detection in the second detection target area R2. Hence, regarding the pixels constituting the second area 51b, the position detecting unit 352 does not perform the determination about whether or not the pixels have the luminance to be equal to or greater than the luminance threshold value. In this way, when the detection target area R is enlarged, regarding the pixels for which the determination about whether or not the luminance is equal to or greater than the luminance threshold value has already been performed at the time of performing the detection in the pre-enlargement detection target area R, the position detecting unit 352 does not perform the same determination thereby enabling shortening of the processing time.

Subsequently, the position detecting unit 352 obtains the dimensions of the bright point 52 by counting the number of high luminance pixels (Step S903), and determines whether or not the dimensions of the bright point 52 are equal to or smaller than a predetermined dimensions threshold value (Step S904). As illustrated in FIG. 18, the dimensions of the bright point 52 are smaller than the dimensions of the threshold value area 60. Hence, the position detecting unit 352 determines that the dimensions of the bright point 52 are smaller than the dimensions threshold value (Yes at Step S904). In that case, the position detecting unit 352 determines that the bright point 52 represents the corneal reflex point 921 (Step S605) and ends the operations.

As illustrated in FIG. 18, the bright point 53 is positioned on the outside of the third detection target area R3. However, by the detection performed in the third detection target area R3, the corneal reflex point 921 is detected. Hence, the position detecting unit 352 ends the operations without performing the determination about the bright point 53. In this way, since the operations are ended at the point of time of detection of the corneal reflex point 921, the detection need not be performed with respect to all pixels in the image Im. Meanwhile, the bright point 53 includes an area 53a positioned on the inside of the pupil 901, and an area 53b protruding to the outside of the pupil 901. There can be times when the bright point constituting the corneal reflex point 921 (for example, the bright point 52) either protrudes to the outside of the pupil 901 or is present on the outside of the pupil 901. On the other hand, if the corneal reflex point 921 is present on the outside of the curvature changing part 115 (see FIGS. 13 and 14) in the eye 111, the visual point cannot be correctly calculated. Hence, for example, if the curvature changing part 115 is included in the image Im, the bright points 50 that have protruded to the outside of the curvature changing part 115 and the bright points 50 present on the outside of the curvature changing part 115 can be excluded from the detection targets.

Meanwhile, in the present embodiment, as illustrated in FIG. 3, the visual point of the test subject is positioned on the display unit 101. Moreover, the right-side camera 102a and the left-side camera 102b representing the capturing positions of the image Im of the eyes 111 as well as the LED light sources 103a and 103b representing the light source positions are present below the display unit 101. Thus, in the present embodiment, at the time of capturing the image Im, the direction from the visual point of the test subject toward the light source positions is the downward direction. When the visual point of the test subject and the light source positions (the LED light sources 103a and 103b) are in such a positional relationship, the corneal reflex point 921 is formed below the pupil center position 911. That is, the corneal reflex point 921 is not formed above the pupil center position 911. For that reason, in such a case, the position detecting unit 352 determines that the bright point 50 formed above the pupil center position 911 is not the corneal reflex point 921. Thus, at the time of setting the detection target range R or enlarging the detection target range R, the position detecting unit 352 can perform the setting or the enlargement only in the downward direction with reference to the pupil center position 911. That is, with reference to FIG. 18, only the lower side of a horizontal straight line H, which passes through the pupil center position 911, can be set as the detection target area R. Thus, when the area in which it is clear that the corneal reflex point 921 is not detected is excluded from the detection target range R, the processing time can be shortened.

As described above, the corneal reflex position detection device 100 according to the present embodiment detects the pupil center position 911 from the image Im of an eye of the test subject, and includes the position detecting unit 352 for detecting the corneal reflex point 921 from the image Im. The position detecting unit 352 enlarges, in a stepwise manner, the detection target area R with reference to the pupil center position 911, and accordingly determines whether or not high-luminance areas (the bright points 50) having the luminance to be equal to or greater than the luminance threshold value are present in the image Im. If a high-luminance area is detected, then the position detecting unit 352 determines that the high-luminance area represents the corneal reflex point 921.

Moreover, the corneal reflex position detection method according to the present embodiment includes detecting the pupil center position 911 from the image Im of an eye of the test subject, and detecting the corneal reflex point 921 from the image Im. Herein, detecting the corneal reflex point 921 includes enlarging, in a stepwise manner, the detection target area R with reference to the pupil center position 911, and accordingly determining whether or not high-luminance areas (the bright points 50) having the luminance to be equal to or greater than the luminance threshold value are present in the image Im; and includes determining, when a high-luminance area is detected, that the high-luminance area represents the corneal reflex point 921.

According to the corneal reflex position detection device 100 and the corneal reflex position detection method, the bright point 50 can be detected while enlarging, in a stepwise manner, the detection target area R with reference to the pupil center position 911, and it can be determined whether or not the bright point 50 represents the corneal reflex point 921. As a result, since the detection target area R is widened from the area close to the pupil center position 911, the bright point 50 representing the corneal reflex point 921 can be detected in an efficient manner. Moreover, when the corneal reflex point 921 is detected, there is no need to perform the detection operation with respect to the other areas, thereby enabling detection of the corneal reflex point 921 in an efficient and highly accurate manner.

In the corneal reflex position detection device 100 according to the present embodiment, when a high-luminance area is detected, the position detecting unit 352 further calculates the dimensions of the high-luminance area; and, if the calculated dimensions of the high-luminance area are equal to or smaller than the dimensions threshold value, determines that the high-luminance area represents the corneal reflex point 921. For example, the eyeglass reflection point 721 of the test subject, who is wearing a pair of eyeglasses, has greater dimensions than the corneal reflex point 921. Hence, the dimensions of the detected high-luminance area are calculated and, if the dimensions of the calculated high-luminance area are equal to or smaller than the dimensions threshold value, it is determined that the high-luminance area represents the corneal reflex point 921. With that, the corneal reflex point 921 can be detected in an efficient manner.

In the corneal reflex position detection device 100 according to the present embodiment, when a high-luminance area is present on a continuing basis on the outside of the detection target area R, the position detecting unit 352 calculates the dimensions of the high-luminance area including the portion present on the outside of the detection target area R. With such a configuration, the dimensions of the high-luminance area can be calculated in an efficient manner.

In the corneal reflex position detection device 100 according to the present embodiment, after calculating the dimensions of the high-luminance area that is present on a continuing basis on the outside of the detection target area R; if the detection target area R is enlarged, then the position detecting unit 352 does not perform the determination about whether or not the luminance is equal to or greater than the luminance threshold value regarding the area for which that determination was already performed at the time of detection of the pre-enlargement detection target area R. With such a configuration, regarding the pixels for which the determination was already performed at the time of detection of the pre-enlargement detection target area R, the determination is not repeatedly performed thereby enabling achieving shortening of the processing time.

In the corneal reflex position detection device 100 according to the present embodiment, the image Im includes a plurality of pixels arranged in a matrix-like manner. For each pixel, the position detecting unit 352 determines whether or not the luminance is equal to or greater than the luminance threshold value and, regarding the pixels determined to have the luminance equal to or greater than the threshold value, consecutively determines whether or not the neighboring pixels have the luminance to be equal to or greater than the luminance threshold value; and thus determines the range of the high-luminance area. With such a configuration, the range of the high-luminance area can be detected in an efficient manner.

In the corneal reflex position detection device 100 according to the present embodiment, the LED light sources 103a and 103b are installed for emitting infrared light toward the test subject. The position detecting unit 352 enlarges the detection target area R in one direction with reference to the pupil center position 911. Herein, the one direction corresponds to the direction from the visual point of the test subject toward the light source position at the time of capturing the image Im. With such a configuration, the area in which it is clear that the corneal reflex point 921 is not detected is excluded from the detection target range R, thereby enabling achieving shortening of the processing time.

The eye-gaze tracking device according to the present embodiment includes the corneal reflex position detection device 100 described above. Hence, the corneal reflex point 921 can be detected with efficiency and with a high degree of accuracy. In turn, the eye gaze of the test subject can be tracked with efficiency and with a high degree of accuracy.

The technical scope of the present disclosure is not limited to the present embodiment described above, and can be construed as embodying various deletions, alternative constructions, and modifications that may occur to one skilled in the art that fairly fall within the basic teaching herein set forth. For example, in the present embodiment, the explanation is given for an example in which the right-side camera 102a and the left-side camera 102b that capture images of the eyes of the test subject are installed below the display unit 101. However, that is not the only possible case. Alternatively, the right-side camera 102a and the left-side camera 102b can be installed above the display unit 101. In that case, the corneal reflex point 921 is detected above the pupil center position 911. Hence, the position detecting unit 352 can set or enlarge the detection target area R above the pupil center position 911.

Moreover, in the present embodiment described above, the explanation is given for an example in which the detection target area R is set as the inside of a circular area. However, that is not the only possible case. Alternatively, the detection target can be set as the inside of a polygonal shape such as a triangle or as the inside of some other shape such as an elliptical shape or an oval shape. Moreover, the configuration is not limited to have the detection target area R enlarged to become a similarity shape, and the detection target area R can be enlarged to become a non-similarity shape or some other shape.

According to the present disclosure, the corneal reflex area can be detected with efficiency and with a high degree of accuracy.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A corneal reflex position detection device comprising:
    a pupil detecting unit that detects center position of pupil from an image of an eye of a test subject; and
    a corneal reflex detecting unit that detects a corneal reflex area from the image, wherein
    the corneal reflex detecting unit
        enlarges, in a stepwise manner, a detection target area with reference to the center position of the pupil, to detect whether or not a high-luminance area having luminance to be equal to or greater than a luminance threshold value is present in the image,
        if the high-luminance area is detected, determines that the high-luminance area represents the corneal reflex area, further calculates dimensions of the high-luminance area upon detection thereof, and
        if calculated dimensions of the high-luminance area are equal to or smaller than a dimensions threshold value, determines that the high-luminance area represents the corneal reflex area.

2. The corneal reflex position detection device according to claim 1, wherein, when the high-luminance area is present on a continuing basis on outside of the detection target area, the corneal reflex detecting unit calculates dimensions of the high-luminance area including portion present on outside of the detection target area.

3. The corneal reflex position detection device according to claim 1, further comprising a light source that emits infrared light toward the test subject, wherein
    the corneal reflex detecting unit enlarges the detection target area in one direction with reference to the center position of the pupil, and
    the one direction corresponds to direction from visual point of the test subject toward position of the light source at time of capturing the image.

4. An eye-gaze tracking device comprising the corneal reflex position detection device according to claim 1.

5. A corneal reflex point detection method comprising:
    detecting center position of pupil from an image of an eye of a test subject; and
    detecting a corneal reflex area from the image, wherein
    the detecting of the corneal reflex area includes
        enlarging, in a stepwise manner, a detection target area with reference to the center position of the pupil, to detect whether or not a high-luminance area having luminance to be equal to or greater than a luminance threshold value is present in the image,
        if the high-luminance area is detected, determining that the high-luminance area represents the corneal reflex area,
        further calculates dimensions of the high-luminance area upon detection thereof, and
        if calculated dimensions of the high-luminance area are equal to or smaller than a dimensions threshold value, determines that the high-luminance area represents the corneal reflex area.

* * * * *